US012018834B2

(12) United States Patent
Shigitani et al.

(10) Patent No.: US 12,018,834 B2
(45) Date of Patent: Jun. 25, 2024

(54) LIGHT-EMITTING DEVICE, LIGHTING SYSTEM, AND OPTICAL COMMUNICATION SYSTEM

(71) Applicant: Panasonic Intellectual Property Management Co., Ltd., Osaka (JP)

(72) Inventors: Ryosuke Shigitani, Osaka (JP); Kazuyuki Yamae, Nara (JP); Hironori Akiyama, Osaka (JP); Hideki Wada, Osaka (JP); Kotone Mori, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 17/802,567

(22) PCT Filed: Feb. 22, 2021

(86) PCT No.: PCT/JP2021/006693
§ 371 (c)(1),
(2) Date: Aug. 26, 2022

(87) PCT Pub. No.: WO2021/182096
PCT Pub. Date: Sep. 16, 2021

(65) Prior Publication Data
US 2023/0080967 A1    Mar. 16, 2023

(30) Foreign Application Priority Data
Mar. 10, 2020    (JP) ................ 2020-041112

(51) Int. Cl.
*F21V 7/00*    (2006.01)
*F21Y 115/10*    (2016.01)

(52) U.S. Cl.
CPC .......... *F21V 7/0008* (2013.01); *F21V 7/0091* (2013.01); *F21Y 2115/10* (2016.08)

(58) Field of Classification Search
CPC ... F21V 7/0008; F21V 7/0091; F21Y 2115/10
See application file for complete search history.

(56) References Cited

U.S. PATENT DOCUMENTS

| 8,944,662 B2 | 2/2015 | Thompson et al. |
| 2005/0052859 A1* | 3/2005 | Lazarev ............ G02F 1/133617 362/600 |

(Continued)

FOREIGN PATENT DOCUMENTS

| JP | 2806937 B2 | 9/1998 |
| JP | 2013-77473 A | 4/2013 |

(Continued)

OTHER PUBLICATIONS

International Search Report for corresponding Application No. PCT/JP2021/006693, mailed Mar. 23, 2021.
Written Opinion for corresponding Application No. PCT/JP2021/006693, mailed Mar. 23, 2021.
Extended European Search Report dated Aug. 4, 2023 corresponding to European Application No. 217676170.

(Continued)

*Primary Examiner* — Abdulmajeed Aziz
*Assistant Examiner* — Jessica M Apenteng
(74) *Attorney, Agent, or Firm* — Renner, Otto, Boisselle & Sklar, LLP

(57) ABSTRACT

A light-emitting device includes: a light guide that includes (i) a light-transmissive member that is light-transmissive at least in a visible light region and (ii) a light control layer that is disposed on at least a part of a surface of the light-transmissive member; and a light source that emits light toward at least one end surface of the light-transmissive member. The light control layer has reflected-wavelength selectivity that makes a wavelength of reflected light dependent on an incident angle of incident light.

14 Claims, 35 Drawing Sheets

(56) References Cited

U.S. PATENT DOCUMENTS

| | | | |
|---|---|---|---|
| 2007/0051883 A1* | 3/2007 | Rains | G01J 3/0256 250/228 |
| 2010/0172153 A1* | 7/2010 | Ijzerman | G02B 6/004 362/613 |
| 2011/0044069 A1* | 2/2011 | Sato | G02B 6/4201 250/504 R |
| 2011/0170277 A1* | 7/2011 | Li | H01L 33/50 362/84 |
| 2013/0070482 A1* | 3/2013 | Miyazaki | G02B 6/0038 362/624 |
| 2014/0375897 A1 | 12/2014 | Sugiura | |
| 2015/0249186 A1 | 9/2015 | Inada et al. | |
| 2016/0327715 A1 | 11/2016 | Inada et al. | |
| 2019/0204495 A1 | 7/2019 | Lee et al. | |
| 2019/0358989 A1* | 11/2019 | Locke | B42D 25/425 |
| 2021/0246330 A1 | 8/2021 | Shigitani et al. | |

FOREIGN PATENT DOCUMENTS

| | | |
|---|---|---|
| JP | 3183256 U | 5/2013 |
| JP | 2015-526864 A | 9/2015 |
| JP | 2016-8998 A | 1/2016 |
| JP | 2016-33644 A | 3/2016 |
| JP | 2018-141840 A | 9/2018 |
| WO | 2013/121998 A1 | 8/2013 |
| WO | 2014/028278 A1 | 2/2014 |
| WO | 2019/244713 A1 | 12/2019 |

OTHER PUBLICATIONS

Japanese Office Action dated Aug. 22, 2023 corresponding to Japanese Patent Application 2022-505896.

* cited by examiner

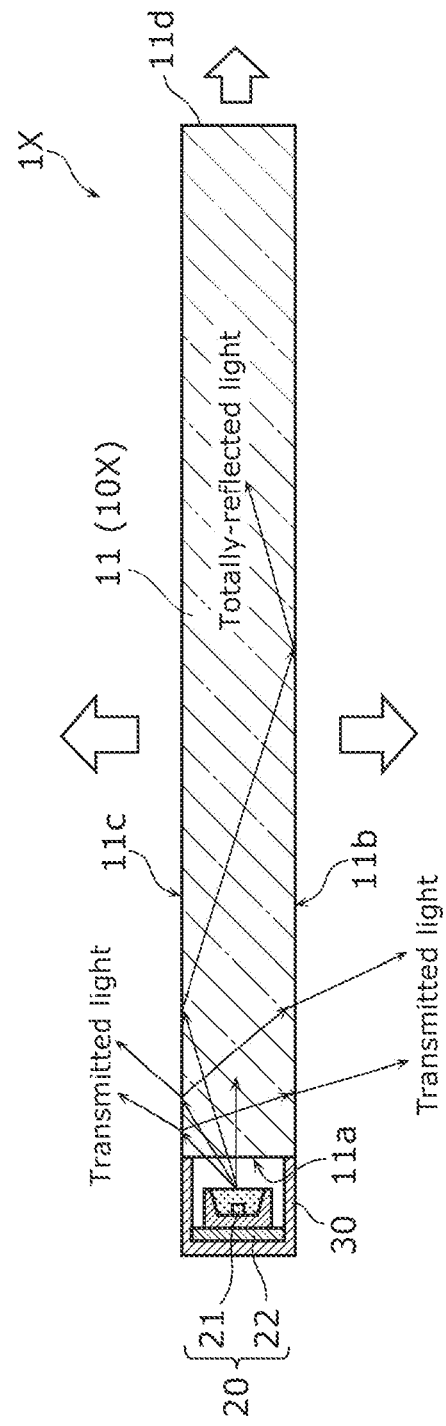

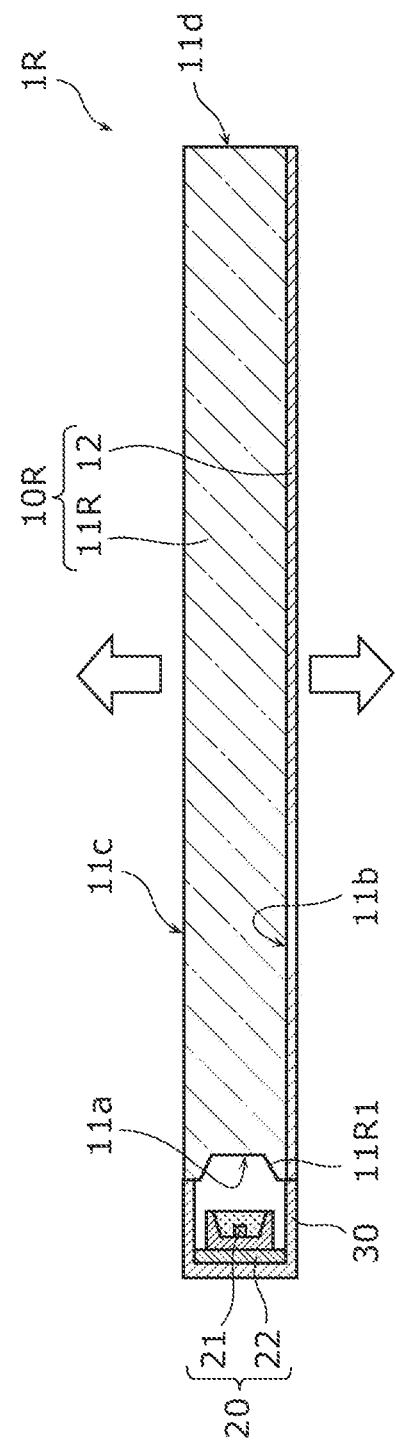

LIGHT-EMITTING DEVICE, LIGHTING SYSTEM, AND OPTICAL COMMUNICATION SYSTEM

TECHNICAL FIELD

The present invention relates to a light-emitting device, a lighting system, and an optical communication system.

BACKGROUND ART

One of known light-emitting devices is a lighting device that emits illumination light. Such a lighting device extracts light emitted from a light source to the outside as illumination light. To extract the light, an optical element, such as a light guide plate, a lens, or a filter, is used according to an intended use or a purpose.

For example, Patent Literature (PTL) 1 discloses a lighting device that emits illumination light for a high decorative purpose. This lighting device passes a part of white light emitted from a white light source through a blue filter so that both white light and blue light enters a light guide. With changes made in the ratio between the white light and the blue light according to an incident position of the light guide, a hue of the illumination light changes gradationally from blue to orange.

CITATION LIST

Patent Literature

[PTL 1] Japanese Unexamined Patent Application Publication No. 2018-141840

SUMMARY OF INVENTION

Technical Problem

It is an object of the present invention to provide a light-emitting device and so forth that are capable of extracting light using a new method by devising a positional relationship between a plurality of optical elements and a light source is devised.

Solution to Problem

In accordance with an aspect of the present invention, a light-emitting device includes: a light guide that includes (i) a light-transmissive member that is light-transmissive at least in a visible light region and (ii) a light control layer that is disposed on at least a part of a surface of the light-transmissive member; and a light source that emits light toward at least one end surface of the light-transmissive member. The light control layer has reflected-wavelength selectivity that makes a wavelength of reflected light dependent on an incident angle of incident light.

In accordance with another aspect of the present invention, a lighting system includes the above-described light-emitting device as a lighting device.

In accordance with still another aspect of the present invention, an optical communication system includes the above-described light-emitting device as an optical transmission device.

Advantageous Effects of Invention

Light can be extracted by a new method.

BRIEF DESCRIPTION OF DRAWINGS

FIG. 4 illustrates an optical action of a light-emitting device according to Comparative Example 1.

FIG. 35 is a cross-sectional view of a light-emitting device according to Variation 13.

DESCRIPTION OF EMBODIMENTS

Hereinafter, certain exemplary embodiments will be described in detail with reference to the accompanying Drawings. The following embodiments are specific examples of the present disclosure. The numerical values, shapes, materials, elements, arrangement and connection configuration of the elements, etc., described in the following embodiments are merely examples, and are not intended to limit the present disclosure. Among elements in the following embodiments, those not described in any one of the independent claims indicating the broadest concept of the present disclosure are described as optional elements.

It should be noted that the respective figures are schematic diagrams and are not necessarily precise illustrations. Additionally, components that are essentially the same share like reference signs in the figures. Accordingly, overlapping explanations thereof are omitted or simplified.

Embodiment 1

Figure 1:
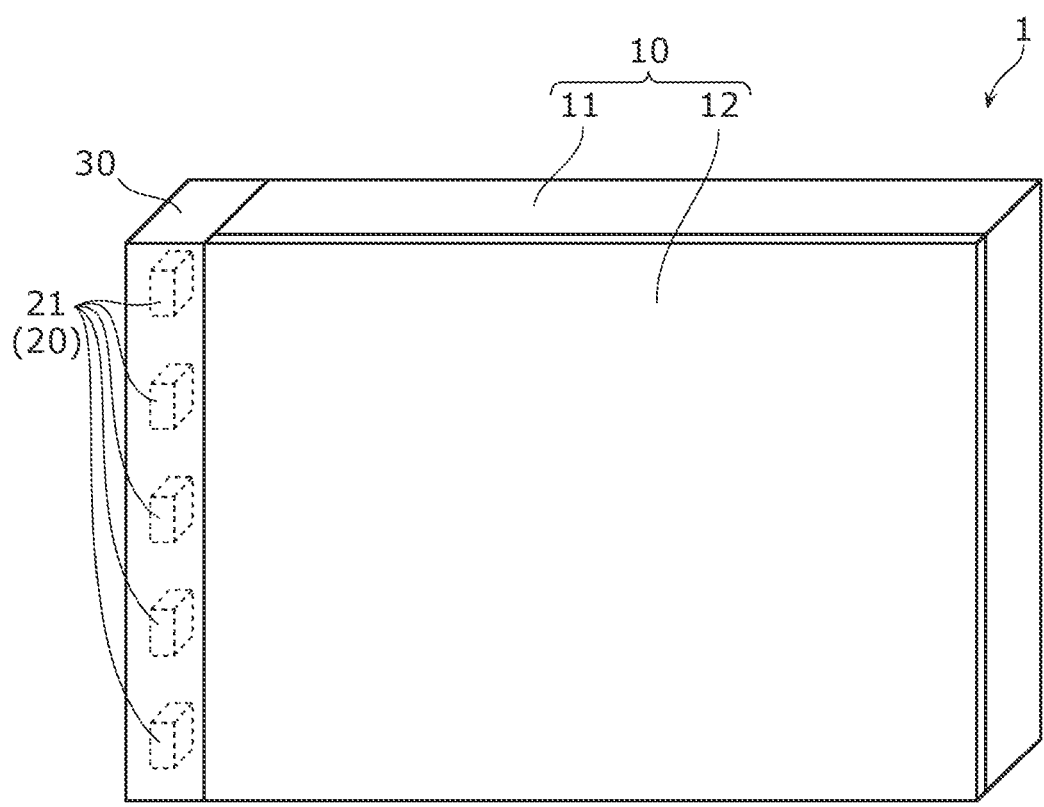
FIG. 1 is a perspective view of a light-emitting device according to Embodiment 1.
Figure 2:
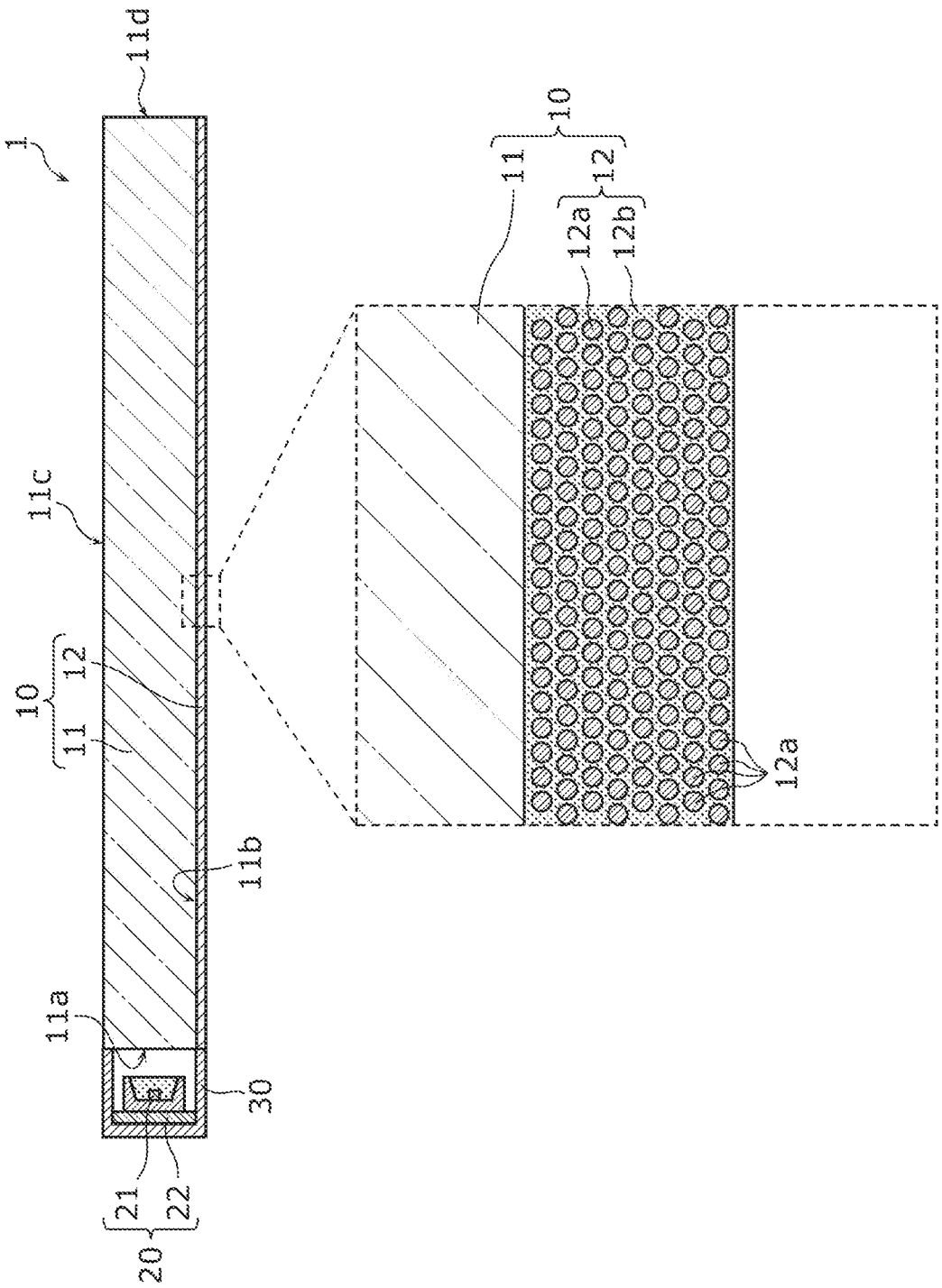
FIG. 2 is a cross-sectional view of the light-emitting device according to Embodiment 1.

First, a configuration of light-emitting device 1 according to Embodiment 1 is described with reference to FIG. 1 and FIG. 2. FIG. 1 is a perspective view of light-emitting device 1 according to Embodiment 1. FIG. 2 is a cross-sectional view of light-emitting device 1.

As illustrated in FIG. 1 and FIG. 2, light-emitting device 1 includes: light guide 10 that guides light; light source 20 that emits light; and enclosure 30 that accommodates light source 20.

Light guide 10 is an optical element that guides the light emitted from light source 20 to the outside of light guide 10. In the present embodiment, light guide 10 includes: light-transmissive member 11 upon which the light emitted from light source 20 is incident; and light control layer 12 that exerts an optical action on the light entering light guide 10 from light source 20 and then emits this light to the outside of light guide 10.

Light-transmissive member 11 is an optical element that is light-transmissive at least in a visible light region. More specifically, light-transmissive member 11 has optical characteristics that allow visible light to pass through light-transmissive member 11. Transmittance of light-transmissive member 11 may be higher, and may be at least 50%. To be more specific, light-transmissive member 11 may be transparent to visible light. Transmittance of light-transmissive member 11 that is transparent is sufficiently high to allow an opposite side to be seen through light-transmissive member 11. In this case, transmittance of light-transmissive member 11 that is transparent to visible light may be at least 70%, preferably at least 80%, or more preferably at least 90%, for example. Note that light-transmissive member 11 may be light-transmissive not only in the visible light region but also in a near-infrared region. More specifically, light-transmissive member 11 may be light-transmissive in the visible light region and in the near-infrared region.

Light-transmissive member 11 has first end surface 11a and second end surface 11d that is opposed to first end surface 11a. In the present embodiment, light-transmissive member 11 is a plate substrate. Furthermore, light-transmissive member 11 has first main surface 11b and second main surface 11c that is opposed to first main surface 11b. First main surface 11b and second main surface 11c come into view when light-transmissive member 11, which is the substrate, is viewed from above. At this time, first end surface 11a and second end surface 11d are side surfaces of the substrate. In the present embodiment, light-transmissive member 11 is the substrate that is rectangular when viewed from above. Here, first end surface 11a and second end surface 11d are parallel to each other, and first main surface 11b and second main surface 11c are parallel to each other. Moreover, first end surface 11a and second end surface 11d are perpendicular to first main surface 11b and second main surface 11c. Light-transmissive member 11 has a thickness of a few millimeters to a few centimeters for example, although it is not intended to be limiting.

Light-transmissive member 11 is made using a light-transmissive material. Light-transmissive member 11 is a transparent substrate that is transparent to visible light. For example, light-transmissive member 11 may be a transparent resin substrate made using a transparent resin material, or a glass substrate made using a transparent glass material. Examples of the transparent resin substrate include: an acrylic substrate made using an acrylic resin; and a polycarbonate substrate made using a polycarbonate resin. Such transparent resin substrate may be a rigid substrate that is inflexible or a flexible substrate that is flexible. In the present embodiment, a rigid transparent acrylic substrate is used as light-transmissive member 11.

Light-transmissive member 11 functions as a light guide plate. Light entering light-transmissive member 11 is guided to proceed inside of light-transmissive member 11, and is emitted to the outside of light-transmissive member 11. Thus, light-transmissive member 11 has: a light incident surface upon which the light is incident; and a light emission surface from which the light incident from the light incident surface is emitted to the outside. In the present embodiment, first end surface 11a of light-transmissive member 11 is the light incident surface upon which the light emitted from light source 20 is incident. Moreover, in the present embodiment, a surface of light-transmissive member 11 other than first end surface 11a is the light emission surface from which the light guided in the inside of light-transmissive member 11 is emitted. For example, each of first main surface 11b, second main surface 11c, and second end surface 11d is the light emission surface of light-transmissive member 11. Although described in a variation later, first main surface 11b, second main surface 11c, or second end surface 11d may be the light incident surface. Moreover, although described in a variation later, a surface other than main surface 11b, second main surface 11c, and second end surface 11d may be the light emission surface.

Light control layer 12 is an optical element that exerts the optical action on the light that enters light control layer 12. Light control layer 12 is disposed on at least a part of the surface of light-transmissive member 11. Thus, light control layer 12 exerts the optical action on the light that enters light control layer 12 from light-transmissive member 11. The optical action of light control layer 12 is described later.

In the present embodiment, light control layer 12 is disposed on first main surface 11b of light-transmissive member 11. More specifically, light control layer 12 is disposed on an entire surface of first main surface 11b of light-transmissive member 11 to be in contact with first main surface 11b. Light control layer 12 is uniform in thickness across the entire surface of light control layer 12. To be more specific, light control layer 12 has uniform thickness. Light control layer 12 may have a thickness between 5 μm and 100 μm inclusive, for example. However, this is not intended to be limiting.

Light control layer 12 has reflected-wavelength selectivity that makes a wavelength of reflected light dependent on an incident angle of incident light. More specifically, light control layer 12 has reflected-wavelength selectivity that makes a wavelength of light reflected when incident upon light control layer 12 dependent on an incident angle of this incident light.

To be more specific, light control layer 12 has a three-dimensional periodic structure that is three-dimensionally periodic. In the present embodiment, light control layer 12 is a colloidal crystal film including a colloidal crystal. Light control layer 12, which is the colloidal crystal film, includes a plurality of nanoparticles 12a and base resin 12b that holds the plurality of nanoparticles, as illustrated in an enlarged view of FIG. 2. In the present embodiment, the plurality of nanoparticles 12a (colloidal particles) are periodically and regularly arranged in three dimensions, as the colloidal crystal in base resin 12b. More specifically, to form the colloidal crystal, the plurality of nanoparticles 12a are periodically and regularly arranged in three axial directions, which include a thickness direction of light-transmissive member 11 and two axial directions (horizontal directions) parallel to first main surface 11b of light-transmissive member 11. The plurality of nanoparticles 12a are arranged uniformly across the entire surface of light control layer 12.

Nanoparticle 12a is a particle with a nano-order diameter. In the present embodiment, the plurality of nanoparticles 12a included in light control layer 12 basically have the same diameter. However, the diameters of the plurality of nanoparticles 12a may slightly vary. Although the details are described later, the optical action of light control layer 12 can be changed by adjusting an average diameter and/or concentration of the plurality of nanoparticles 12a included in light control layer 12.

Each of the plurality of nanoparticles 12a is a light-transmissive particle that allows light to pass through this nanoparticle, for example. Examples of nanoparticle 12a that is a light-transmissive particle include: an inorganic particle, such as a silica particle made from $SiO_2$; and a polymer particle, such as a polystyrene particle or an acrylic particle. In the present embodiment, a silica particle is used as nanoparticle 12a.

Base resin 12b is a binder that fixes the plurality of nanoparticles 12a. Base resin 12b is made using a light-transmissive resin material. In the present embodiment, base resin 12b is made using a resin material that is transparent to visible light. For example, base resin 12b may contain at least one selected from a group including an acrylic resin, a polycarbonate resin, a cycloolefin resin, an epoxy resin, a silicon resin, and a styrene resin.

Light control layer 12, which is the colloidal crystal film, is made as follows, for example.

First, silica particles are added to a monomer including triethylene glycol dimethacrylate (such as "NK ESTER 3G" from SHIN-NAKAMURA CHEMICAL Co., Ltd.) to achieve a silica-particle content of 40%. After this, ultrasonic dispersion is performed so that the silica particles are regularly arranged in three dimensions in the monomer. As a result, a dispersion liquid in which the silica particles are uniformly dispersed as the colloid particles in the monomer is obtained. Next, a photopolymerization initiator (such as IRGACURE-1173 from IGM Resins B.V.) of 1.0 weight percent with respect to the weight of the monomer is added to this dispersion liquid. Then, light-transmissive member 11 (an acrylic plate of 200 mm square with a thickness of 10 mm, for example) is coated with this dispersion liquid using a bar coater to form a coating film. At this time, a bar coater #10 may be used. Then, the obtained coating film is irradiated with ultraviolet light to be polymerized with the monomer. As a result, the colloidal crystal film as light control layer 12 including the colloidal crystal is formed on the surface of light-transmissive member 11.

Depending on a particle diameter of the plurality of nanoparticles 12a included in the colloidal crystal, the colloidal crystal film made by the above process varies in color when viewed from above. For example, colloidal crystal film G is green when viewed from above, if made by the above process using silica particles with an average particle diameter of 180 nm for nanoparticles 12a. Colloidal crystal film R is red when viewed from above, if made by the above process using silica particles with an average particle diameter of 200 nm for nanoparticles 12a.

Figure 3A:
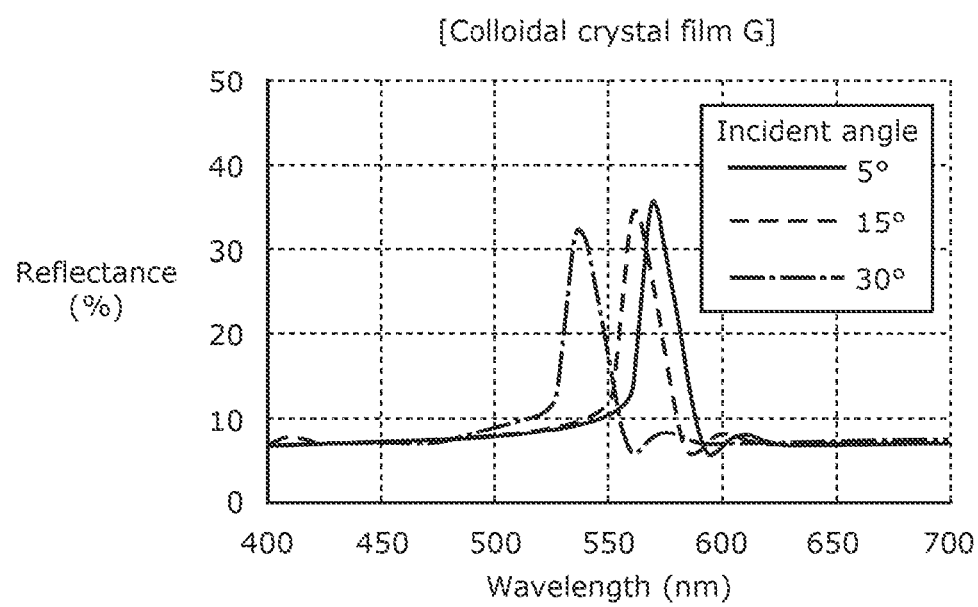
FIG. 3A illustrates reflectance spectrums of colloidal crystal film G that is green when viewed from above.
Figure 3B:
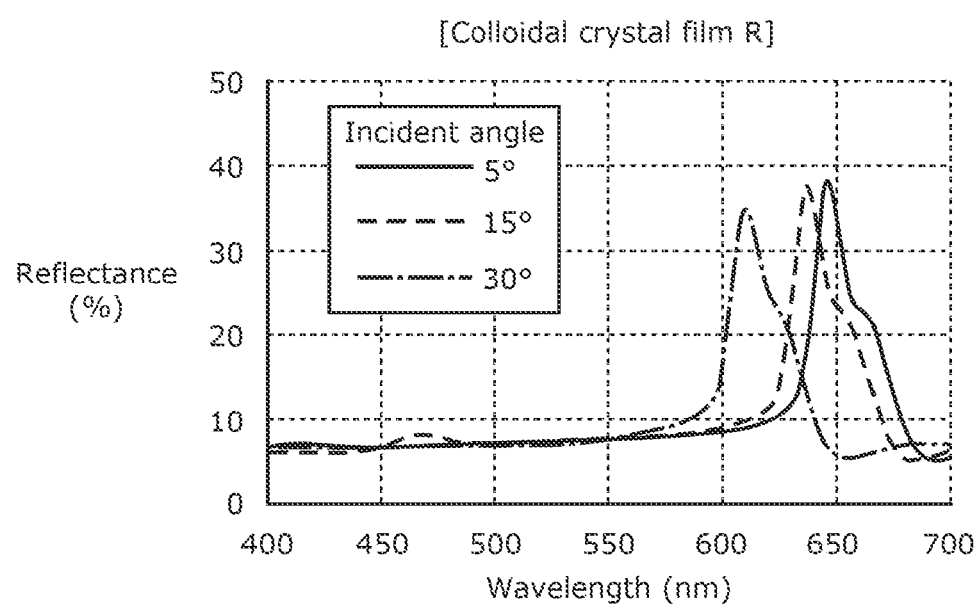
FIG. 3B illustrates reflectance spectrums of colloidal crystal film R that is red when viewed from above.

Here, reflectance spectrums of colloidal crystal film G and colloidal crystal film R actually made were measured. Results of the measurement are illustrated in FIG. 3A and FIG. 3B. FIG. 3A illustrates the reflectance spectrums of colloidal crystal film G that is green when viewed from above. FIG. 3B illustrates the reflectance spectrums of colloidal crystal film R that is red when viewed from above. To obtain the reflectance spectrums illustrated in FIG. 3A and FIG. 3B, a reflectance spectrum was measured for each of incident angles of 5°, 15°, and 30°. The reflectance spectrum was measured using a spectrophotometer (V-650) from JASCO (Nihon Bunko Co., Ltd.) with a measurement option of ARMV-734.

As illustrated in FIG. 3A and FIG. 3B, the results show that both colloidal crystal film G and colloidal crystal film R have reflected-wavelength selectivity that makes a wavelength of reflected light dependent on an incident angle of incident light.

More specifically, colloidal crystal film G illustrated in FIG. 3A has a peak wavelength of the reflected light: at about 570 nm at the incident angle of 5°; at about 560 nm at the incident angle of 15°; and at about 540 nm at the incident angle of 30°. Thus, colloidal crystal film G has a reflected-wavelength region from green to yellow-green. Here, a specular reflected wavelength (at an incident angle of 0°) of colloidal crystal film G is to be between 570 nm and 580 nm inclusive.

On the other hand, colloidal crystal film R illustrated in FIG. 3B has a peak wavelength of the reflected light: at about 645 nm at the incident angle of 5°; at about 640 nm at the incident angle of 15°; and at about 610 nm at the incident angle of 30°. Thus, colloidal crystal film R has a reflected-wavelength region in a red region. Here, a specular reflected wavelength (at an incident angle of 0°) of colloidal crystal film R is to be between 645 nm and 655 nm inclusive.

Light source 20 emits light toward light guide 10. To be more specific, light source 20 emits the light toward at least one end surface of light-transmissive member 11 of light guide 10. In the present embodiment, light source 20 emits the light toward first end surface 11a of light-transmissive member 11. Thus, the light emitted from light source 20 is incident upon first end surface 11a of light-transmissive member 11. In the present embodiment, an optical axis of light source 20 is perpendicular to first end surface 11a of light-transmissive member 11 and parallel to first main surface 11b of light-transmissive member 11.

Light source 20 is disposed opposite to first end surface 11a of light-transmissive member 11. Thus, light source 20 and light-transmissive member 11 form an edge light structure. To be more specific, a light emission surface of light source 20 is opposed to first end surface 11a of light-transmissive member 11.

Light source 20 is a light-emitting diode (LED) module including an LED. In the present embodiment, light source 20 emits white light. Thus, the white light emitted from light source 20 is incident upon first end surface 11a that is the light incident surface of light-transmissive member 11.

Light source 20 includes light-emitting element 21 and mounting substrate 22 on which light-emitting element 21 is mounted. On mounting substrate 22, one or more light-emitting elements 21 are mounted. In the present embodiment, a plurality of light-emitting elements 21 are mounted on mounting substrate 22. Mounting substrate 22 is a long wiring substrate on which metallic wires are laid in a predetermined pattern, for example. Examples of a base substrate of mounting substrate 22 include a resin substrate, a ceramic substrate, and a metallic substrate that is coated with an insulating film.

Light-emitting element 21 is an LED light source including an LED. More specifically, light-emitting element 21 is a white LED light source that emits white light. For example, light-emitting element 21 is of individually packaged surface-mount device (SMD) type. Light-emitting element 21 includes: a white resin-made or ceramic-made package having a recess; at least one LED chip primarily implemented at the bottom of the recess of the package; and a sealant that is charged into the recess of the package to seal the LED chip. The sealant is made using a light-transmissive resin material, such as a silicon resin. The sealant may be a phosphor-contained resin that contains a wavelength converter, such as a phosphor.

As an example of a semiconductor light-emitting element that emits light using predetermined direct-current power, the LED chip is a bare chip that emits monochromatic visible light. For example, the LED chip is a blue LED chip that emits blue light when energized. In this case, to obtain white light, the sealant contains a yellow phosphor like yttrium aluminum garnet (YAG) that is excited by the blue light from the blue LED chip and that thereby emits fluorescent light.

As described above, light-emitting element 21 according to the present embodiment is a white light LED element that includes the blue LED chip and the yellow phosphor. To be more specific, the yellow phosphor absorbs a part of the blue light emitted by the blue LED chip, and is thereby excited to emit yellow light. Then, this yellow light and blue light that is not absorbed by the yellow phosphor are mixed to create white light. Note that the sealant may include not only the yellow phosphor but also a red phosphor and a green phosphor.

The plurality of light-emitting elements 21 are linearly arranged on mounting substrate 22 along a longitudinal direction of mounting substrate 22. The plurality of light-emitting elements 21 linearly arranged function as a line light source that emits linear light. In the present embodiment, the plurality of light-emitting elements 21 are mounted at substantially regular spacings in a single row along the longitudinal direction of mounting substrate 22. Note that each of the plurality of light-emitting elements 21 is placed on mounting substrate 22 so that a main light-emitting surface of light-emitting element 21 is opposed to first end surface 11a (the light incident surface) of light-transmissive member 11.

Note that light-emitting element 21 itself may be a LED element that is a LED chip (a bare chip). In this case, light source 20 (the LED module) has a chip-on-board (COB) construction in which light-emitting element 21, which is the LED chip, is directly mounted on mounting substrate 22. For light source 20 that is the LED module having the COB construction, a blue LED chip may be used as light-emitting element 21, for example. In this case, a plurality of blue LED chips may be mounted in a single row on mounting substrate 22. Then, the plurality of blue LED chips may be sealed individually or collectively by a sealant made of a silicon resin containing a yellow phosphor.

Alternatively, light source 20 may include, separately from or jointly with light source 20, as needed: a variable light distribution mechanism such as a lens that changes distribution of light emitted from light source 20; a filter that controls a wavelength of light emitted from light source 20; or an optical member such as a diffuser panel that scatters and transmits light emitted from light source 20.

Light source 20 is driven by electric power supplied from a power supply unit, which is not illustrated. For example, the power supply unit includes: a power source (power source circuit) including a circuit substrate on which a plurality of circuit components are mounted; and an enclosure that accommodates the power source. The power source converts electric power received by the power supply unit into predetermined electric power, and supplies this power to light source 20. This enables light source 20 to be driven to emit light. The power supply unit may be included in or separate from light-emitting device 1. Alternatively, light-emitting device 1 may include the power source.

Light source 20 is included in enclosure 30. Enclosure 30 is a box-like housing that has an opening. For example, enclosure 30 is made using a metallic material or a resin material. Light source 20 is placed at the bottom of enclosure 30. To be more specific, mounting substrate 22 of light source 20 is placed on a bottom surface of enclosure 30. Note that light source 20 and enclosure 30 may be combined as a light source unit. Although the opening of enclosure 30 is closed by first end surface 11a of light guide 10 in the present embodiment, this is not intended to be limiting.

Light emitted from light source 20 of light-emitting device 1 configured as described above enters light guide 10 from the end surface of light guide 10, and is guided and emitted to the outside from light guide 10. More specifically, the light emitted from light source 20 of light-emitting device 1 enters light-transmissive member 11 from first end surface 11a and is guided in light-transmissive member 11. Then, a part of this light enters light control layer 12 from first end surface 11b. The light entering light control layer 12 from light-transmissive member 11 receives the optical action of light control layer 12 and is emitted to the outside from light control layer 12. Thus, an external surface of light control layer 12 is a surface (the light emission surface) where the light is extracted from light-emitting device 1.

Note that the light of light source 20 that enters light-transmissive member 11 may include not only the light to be emitted to the outside through light control layer 12, but also light to be emitted to the outside without passing through light control layer 12. For example, a part of the light entering light-transmissive member 11 from light source 20 may be emitted from second main surface 11$c$ and second end surface 11$d$ of light-transmissive member 11. Thus, the surface (the light emission surface) where the light is extracted from light-emitting device 1 may be not only the external surface of light control layer 12, but also second main surface 11$c$ and second end surface 11$d$ of light-transmissive member 11.

The light extracted from light-emitting device 1 can be used as illumination light, for example. In this case, light-emitting device 1 is a lighting device that emits illumination light. Because light guide 10 is used in the present embodiment in particular, light-emitting device 1 can be used as a lighting device of light guide type (light-guide illumination device). Note that the light extracted from light-emitting device 1 may be used as light other than illumination light.

Next, the optical action of light-emitting device 1 and the light extracted from light-emitting device 1 are described. More specifically, the optical action of light-emitting device 1 and the light extracted from light-emitting device 1 are described in comparison with light-emitting devices according to Comparative Examples 1 and 2, with reference to FIG. 4 to FIG. 6.

Figure 5:
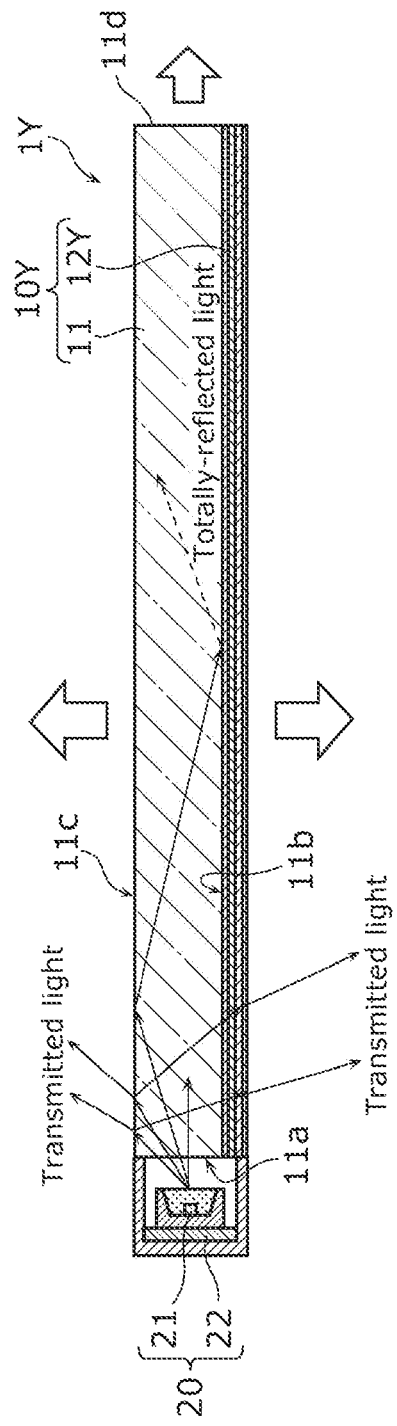
FIG. 5 illustrates an optical action of a light-emitting device according to Comparative Example 2.
Figure 6:
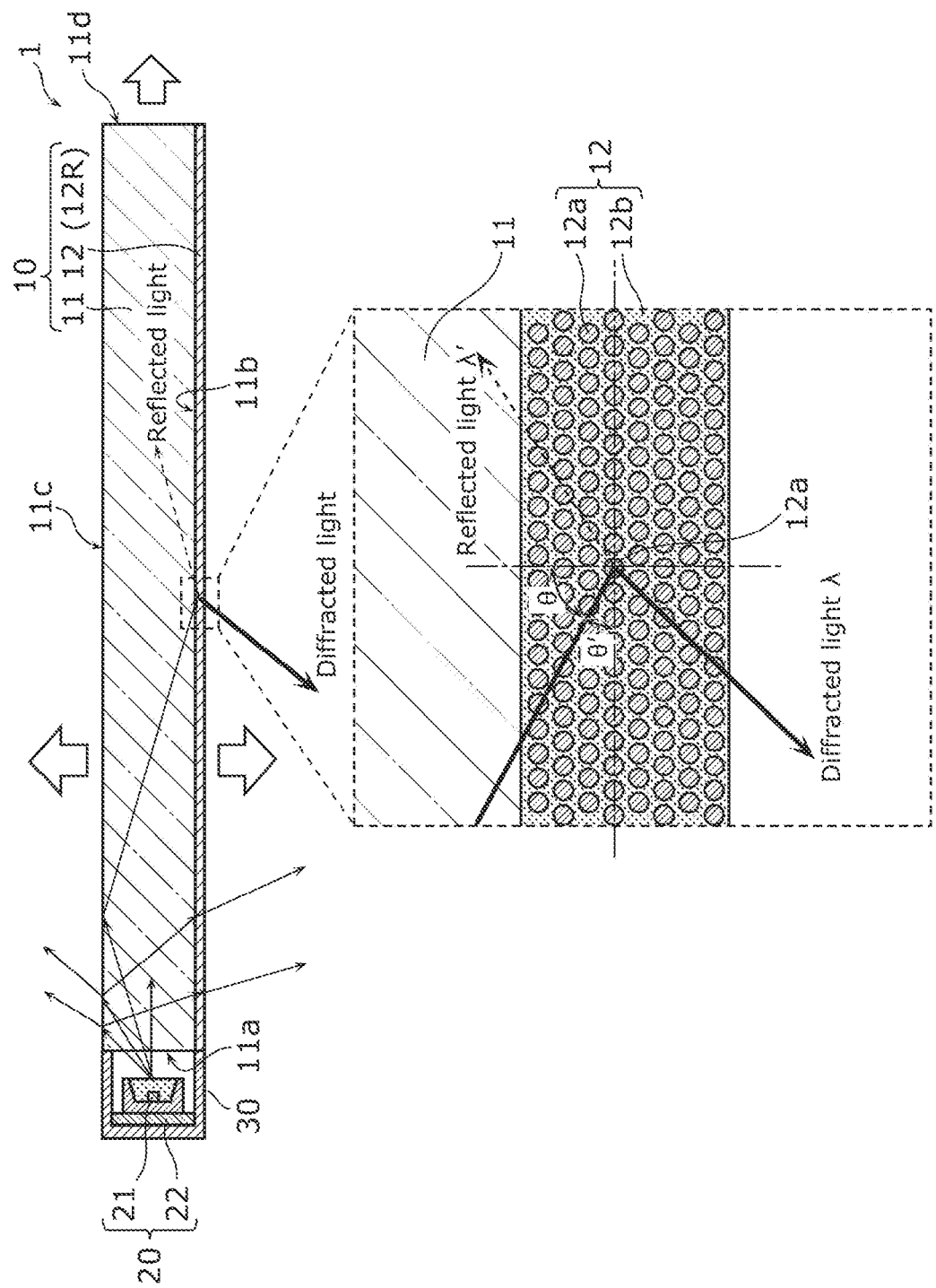
FIG. 6 illustrates an optical action of the light-emitting device according to Embodiment.

FIG. 4 illustrates an optical action of light-emitting device 1X according to Comparative Example 1. FIG. 5 illustrates an optical action of light-emitting device 1Y according to Comparative Example 2. FIG. 6 illustrates the optical action of light-emitting device 1 according to the present embodiment.

Light-emitting device 1X according to Comparative Example 1 illustrated in FIG. 4 is different from light-emitting device 1 according to the present embodiment illustrated in FIG. 6 in that light control layer 12 is not included. To be more specific, light guide 10X of light-emitting device 1X according to Comparative Example 1 includes only light-transmissive member 11.

Light-emitting device 1Y according to Comparative Example 2 illustrated in FIG. 5 is different from light-emitting device 1 according to the present embodiment illustrated in FIG. 6 in that light control layer 12Y formed of an optical multi-layer film replaces light control layer 12 formed of the colloidal crystal film. To be more specific, light guide 10Y of light-emitting device 1Y according to Comparative Example 2 includes: light-transmissive member 11; and light control layer 12Y formed of the optical multi-layer film disposed on first main surface 11$b$ of light-transmissive member 11. The optical multi-layer film of light control layer 12Y is made by stacking a plurality of optical films in the thickness direction of light-transmissive member 11.

Note that light control layer 12 of light-emitting device 1 according to the present embodiment illustrated in FIG. 6 is first light control layer 12R formed of colloidal crystal film R having the reflectance spectrums illustrated in FIG. 3B.

As illustrated in FIG. 4 to FIG. 6, the light emitted from light source 20 of each of light-emitting devices 1X, 1Y, and 1 according to Comparative Examples 1 and 2 and the present embodiment enters light-transmissive member 11 from first end surface 11$a$ of light-transmissive member 11.

In this case, a part of the light guided in light-transmissive member 11 (or more specifically, light guide 10X) of light-emitting device 1X according to Comparative Example 1 illustrated in FIG. 4 passes through first main surface 11$b$ or second main surface 11$c$ to be extracted to the outside of light-transmissive member 11. On the other hand, another part of the light guided in light-transmissive member 11 is guided in light-transmissive member 11 while repeating total reflection on first main surface 11$b$ and second main surface 11$c$. Thus, this part of the light is not extracted from first main surface 11$b$ or second main surface 11$c$.

At this time, the light extracted from first main surface 11$b$ or second main surface 11$c$ of light-transmissive member 11 of light-emitting device 1X according to Comparative Example 1 illustrated in FIG. 4 is the same in color as the light emitted from light source 20, from any angle from which first main surface 11$b$ and second main surface 11$c$ are viewed. For example, if the light emitted from light source 20 is white light, the color of the light extracted from first main surface 11$b$ or second main surface 11$c$ of light-transmissive member 11 illustrated in FIG. 4 is white regardless of an angle of view.

As illustrated FIG. 5, a part of the light guided in light-transmissive member 11 of light-emitting device 1Y according to Comparative Example 2 passes through first main surface 11$b$ to be extracted to the outside of light-transmissive member 11 through light control layer 12Y. Moreover, a part of the light passes through second main surface 11$c$ to be extracted to the outside of light-transmissive member 11 without passing through light control layer 12Y. On the other hand, another part of the light guided in light-transmissive member 11 is guided in light-transmissive member 11 while repeating total reflection on first main surface 11$b$ and second main surface 11$c$. Thus, this part of the light is not extracted from first main surface 11$b$ or second main surface 11$c$.

Here, light control layer 12Y of light-emitting device 1Y according to Comparative Example 2 illustrated in FIG. 5 is the optical multi-layer film having a periodic structure. The optical multi-layer film of light control layer 12Y has a structure that is periodic only in the thickness direction of light-transmissive member 11, or more specifically, has a one-dimensional periodic structure. Thus, the light entering light control layer 12Y from light-transmissive member 11 is not to be diffracted, unlike the case of light-emitting device 1 according to the present embodiment as described later.

As illustrated FIG. 6, a part of the light guided in light-transmissive member 11 of light-emitting device 1 according to the present embodiment passes through first main surface 11$b$ to be extracted to the outside of light guide 10 through light control layer 12. Moreover, a part of the light passes through second main surface 11$c$ to be extracted to the outside of light guide 10 without passing through light control layer 12.

Here, light control layer 12 of light-emitting device 1 illustrated in FIG. 6 is colloidal crystal film R including the colloidal crystal and has the three-dimensional periodic structure. The light passes through first main surface 11$b$ of light-transmissive member 11 is extracted to the outside of light guide 10 through light control layer 12. In this case, when entering light control layer 12 from light-transmissive member 11, the light receives the optical action of colloidal crystal film R of light control layer 12 and then is extracted from light guide 10.

In the present embodiment, light control layer 12 includes the colloidal crystal including the plurality of nanoparticles 12a periodically and regularly arranged in the three axial directions, which include the thickness direction of light-transmissive member 11 and the two axial directions (horizontal directions) parallel to first main surface 11b of light-transmissive member 11. This allows the light entering light control layer 12 from first main surface 11b of light-transmissive member 11 to be diffracted by light control layer 12 and extracted as diffracted light λ from light guide 10.

Here, the light entering light control layer 12 results in diffracted light λ (diffracted wave) that is stronger in a particular direction depending on the periodic spacings in the colloidal crystal. Thus, the light that is guided in light-transmissive member 11 of light-emitting device 1 illustrated in FIG. 6 to enter light control layer 12 from first main surface 11b and is then extracted from light control layer 12 varies in color depending on an angle from which light control layer 12 is viewed.

Figure 7:
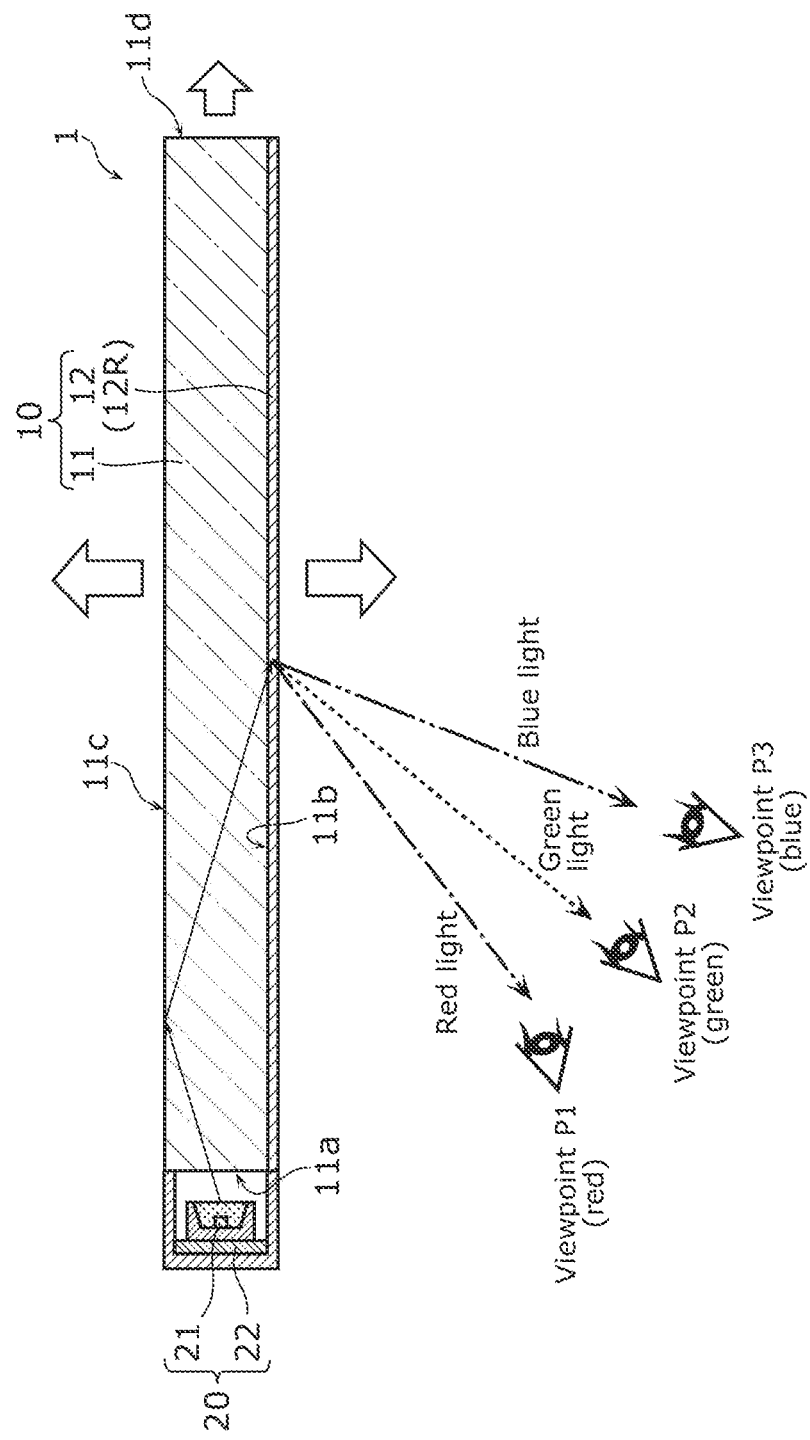
FIG. 7 is a cross-sectional view schematically illustrating how light emitted from the light-emitting device according to Embodiment is seen when colloidal crystal film R is used as a light control layer.
Figure 8:
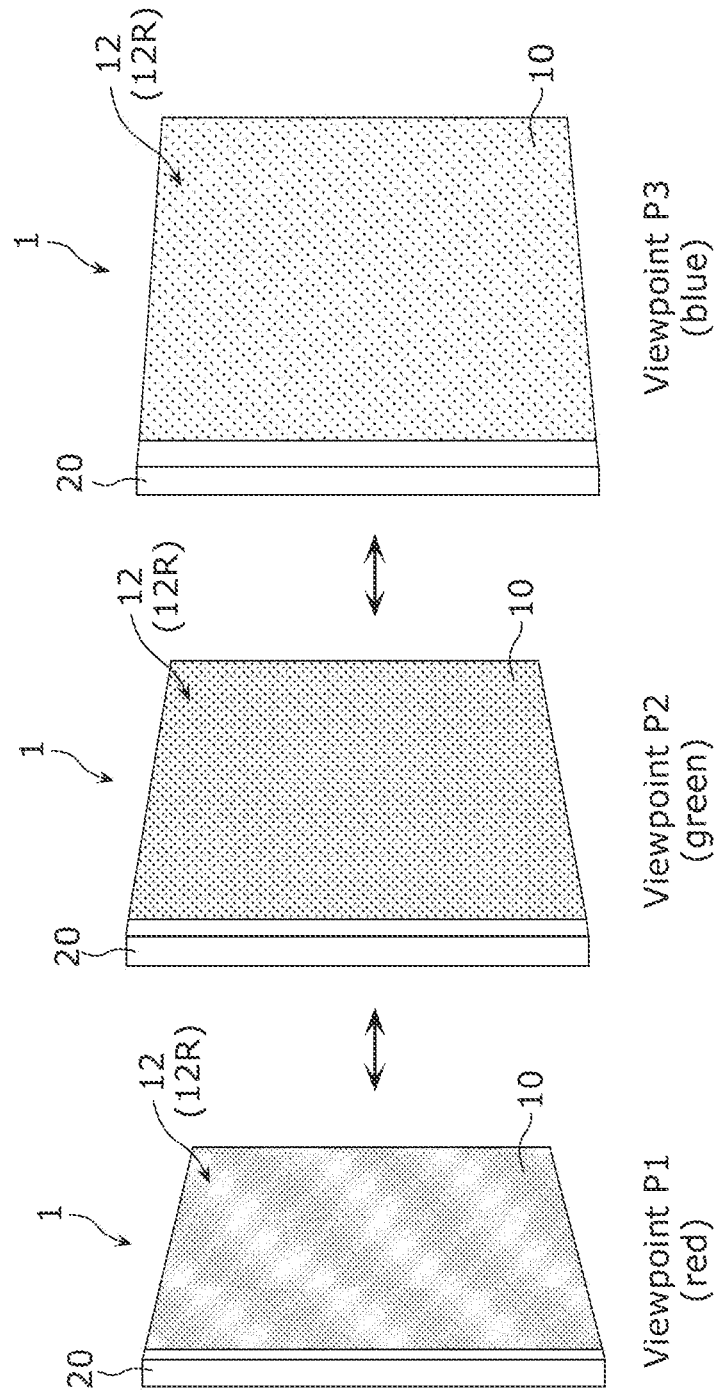
FIG. 8 is a cross-sectional view schematically illustrating how light emitted from the light-emitting device according to Embodiment is seen when colloidal crystal film R is used as a light control layer.

More specifically, light control layer 12 is colloidal crystal film R having the reflectance spectrums illustrated in FIG. 3A. Thus, the light extracted from light control layer 12 has hues widely ranging from a red wavelength to a blue wavelength depending on an angle from which light control layer 12 is viewed as illustrated in FIG. 7 and FIG. 8. For example, red diffracted light from light control layer 12 is seen by eyes of a user at viewpoint P1. Green diffracted light from light control layer 12 is seen by the eyes of the user at viewpoint P2. Blue diffracted light from light control layer 12 is seen by the eyes of the user at viewpoint P3. More specifically, light control layer 12 appears red, green, or blue, depending on an angle from which light control layer 12 is viewed.

On the other hand, the light, out of the light entering light-transmissive member 11, is guided in light-transmissive member 11 to pass through second main surface 11c and be extracted to the outside of light guide 10 without passing through light control layer 12. This light is emitted to the outside from second main surface 11c of light-transmissive member 11 without receiving the optical action of light control layer 12. Without being diffracted by light control layer 12, this light is the same in color as the light emitted from light source 20 regardless of an angle of view.

However, the light entering light-transmissive member 11 includes the light that receives the optical action of light control layer 12 and is then emitted to the outside from second main surface 11c of light-transmissive member 11. To be more specific, out of the light that enters light control layer 12 from first main surface 11b of light-transmissive member 11 and is diffracted by light control layer 12 (that is, out of the diffracted light), light that is totally reflected by an interface surface between light control layer 12 and an air layer and that then returns to light-transmissive member 11 is emitted to the outside from second main surface 11c of light-transmissive member 11.

More specifically, the light extracted to the outside from second main surface 11c of light-transmissive member 11 includes not only the light that does not receive the optical action of light control layer 12, but also the light that receives the optical action of light control layer 12. On this account, the light extracted to the outside from second main surface 11c of light-transmissive member 11 also varies in color depending on an angle from which light-transmissive member 11 is viewed. To be more specific, as in viewing light control layer 12, this light has hues widely ranging from a red wavelength to a blue wavelength depending on an angle from which light-transmissive member 11 is viewed. Thus, light-transmissive member 11 appears red, green, or blue, depending on an angle from which second main surface 11c of light-transmissive member 11 is viewed.

The light entering light control layer 12 of light-emitting device 1 illustrated in FIG. 6 is diffracted by light control layer 12. Thus, this light is diffracted substantially without total reflection even if entering at an angle that may cause total reflection by light control layer 12 as with the light entering light control layer 12 from light-transmissive member 11 of light-emitting device 1Y illustrated in FIG. 5. More specifically, as illustrated in FIG. 6, the light entering light control layer 12 from light-transmissive member 11 substantially results in diffracted light λ regardless of an angle of incident and thus hardly results in reflected light λ'. Hence, light-emitting device 1 illustrated in FIG. 6 can also enhance light extraction efficiency as compared with light-emitting device 1X illustrated in FIG. 4 and light-emitting device 1Y illustrated in FIG. 5.

As described above, first light control layer 12R formed of colloidal crystal film R having the reflectance spectrums illustrated in FIG. 3B is used as light control layer 12. As a result, the light emitted from light source 20 and guided in light guide 10 to be extracted from light guide 10 varies in color depending on an angle from which light guide 10 is viewed. Thus, light guide 10 appears red, green, or blue, depending on an angle from which an external surface of light guide 10 is viewed. In other words, with a change of the angle from which light guide 10 is viewed, an emission color of light guide 10 appears to change.

Figure 9:
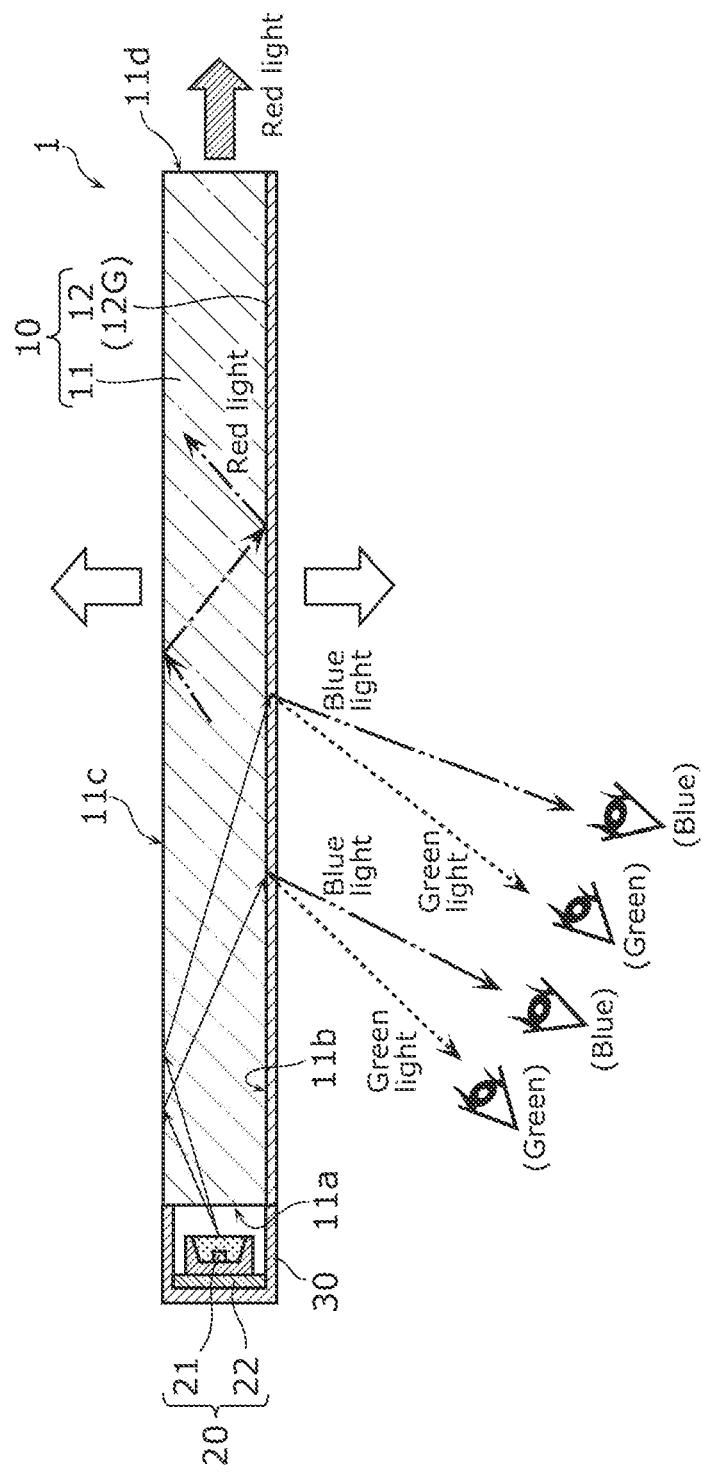
FIG. 9 is a cross-sectional view schematically illustrating how light emitted from the light-emitting device according to Embodiment is seen when colloidal crystal film G is used as a light control layer.

Next, the following describes the case where second light control layer 12G formed of colloidal crystal film G having the reflectance spectrums illustrated in FIG. 3A is used as light control layer 12, with reference to FIG. 9.

Light emitted from light source 20 of light-emitting device 1 illustrated in FIG. 9 is also incident upon the end surface of light guide 10 including light control layer 12 disposed on first main surface 11b of light-transmissive member 11, as with light-emitting device 1 illustrated in FIG. 6. Thus, the light entering light control layer 12 from light-transmissive member 11 is diffracted and thereby results in diffracted light. As a result, the light extracted from light guide 10 varies in color depending on an angle of view.

Here, light of a wavelength shorter than a specular reflection wavelength can be extracted from light control layer 12 formed of the colloidal crystal film. Light control layer 12 of light-emitting device 1 illustrated in FIG. 9 is second light control layer 12G formed of colloidal crystal film G having the specular reflection wavelength in a yellow-green wavelength region. Thus, the light with a wavelength shorter than the yellow-green wavelength is emitted as the diffracted light from light guide 10.

To be more specific, if while light is incident from light source 20 upon the end surface of light guide 10, light extracted from light guide 10 is green diffracted light or blue diffracted light, as illustrated in FIG. 9. More specifically, light guide 10 appears green or blue, depending on an angle from which light guide 10 is viewed.

Meanwhile, the light entering light control layer 12 formed of colloidal crystal film G does not result in red diffracted light. Thus, red light of a red component included in the white light guided in light guide 10 is guided in light-transmissive member 11 without being extracted from light control layer 12. The red light guided in light-transmissive member 11 is emitted to the outside from second main surface 11c or second end surface 11d of light-transmissive member 11, for example. Here, colloidal crystal film G, instead of colloidal crystal film R, is used as light control layer 12. Thus, the red light receives an optical action of light control layer 12 not to be emitted to the outside from light control layer 12 and confined in light-transmissive member 11. Then, the red light can be emitted to the outside from a section of light guide 10 that is different from a location of light control layer 12.

As described above, light-emitting device 1 illustrated in FIG. 9 is capable of extracting the light with a specific wavelength that is different depending on an angle of view, as with light-emitting device 1 illustrated in FIG. 6. In addition, light-emitting device 1 illustrated in FIG. 9 is capable of selectively extracting light of some wavelengths from light control layer 12 as well as confining light of a different wavelength in light guide 10. To be more specific, light-emitting device 1 illustrated in FIG. 9 is capable of selectively extracting the light of a wavelength region from blue to green from light control layer 12. Furthermore, this light-emitting device is capable of confining the light of a region of a wavelength longer than a green wavelength (that is, a red wavelength region) and then selectively extracting this light from second end surface 11d of light-transmissive member 11.

As can be understood from FIG. 6 and FIG. 9, the wavelength of the light to be extracted from light control layer 12 can be controlled according to a composition of the colloidal crystal included in the colloidal crystal film of light control layer 12. Moreover, a specific wavelength can be confined in light-transmissive member 11 according to the composition of the colloidal crystal included in the colloidal crystal film of light control layer 12.

Thus, light-emitting device 1 according to the present embodiment can be used as a lighting device that emits illumination light that varies in color depending on an angle of view. Moreover, light-emitting device 1 can be used as a color-changing light guiding device that guides light that varies in color depending on an angle of view. In addition, light-emitting device 1 can also be used as a narrow-band wavelength selective filter or a spectral prism, for example. Furthermore, light-emitting device 1 is capable of confining the light of a specific wavelength in light-transmissive member 11 as illustrated in FIG. 9. Thus, light-emitting device 1 according to the present embodiment can be used as an optical transmission device that has an optical waveguide that transmits light of a specific wavelength.

Next, the following describes a result of an experiment performed to verify the optical action of light-emitting device 1 according to the present embodiment, with reference to FIG. 10 to FIG. 18.

The present experiment was performed to measure angular dependence of a hue of light extracted from the light control layer and angular dependence of emission intensity of the light extracted from the light control layer. The measurement was made for each of light-emitting device 1 illustrated in FIG. 2 according to the present embodiment and light-emitting device 1X illustrated in FIG. 4 according to Comparative Example 1. Here, as light control layer 12 of light-emitting device 1 according to the present embodiment, colloidal crystal film G having the reflectance spectrums illustrated in FIG. 3A is used in "Example 1" and colloidal crystal film R having the reflectance spectrums illustrated in FIG. 3B is used in "Example 2". Meanwhile, light-emitting device 1X according to Comparative Example 1 includes light guide 10X that includes only light-transmissive member 11 without light control layer 12 (colloidal crystal film).

Figure 10:
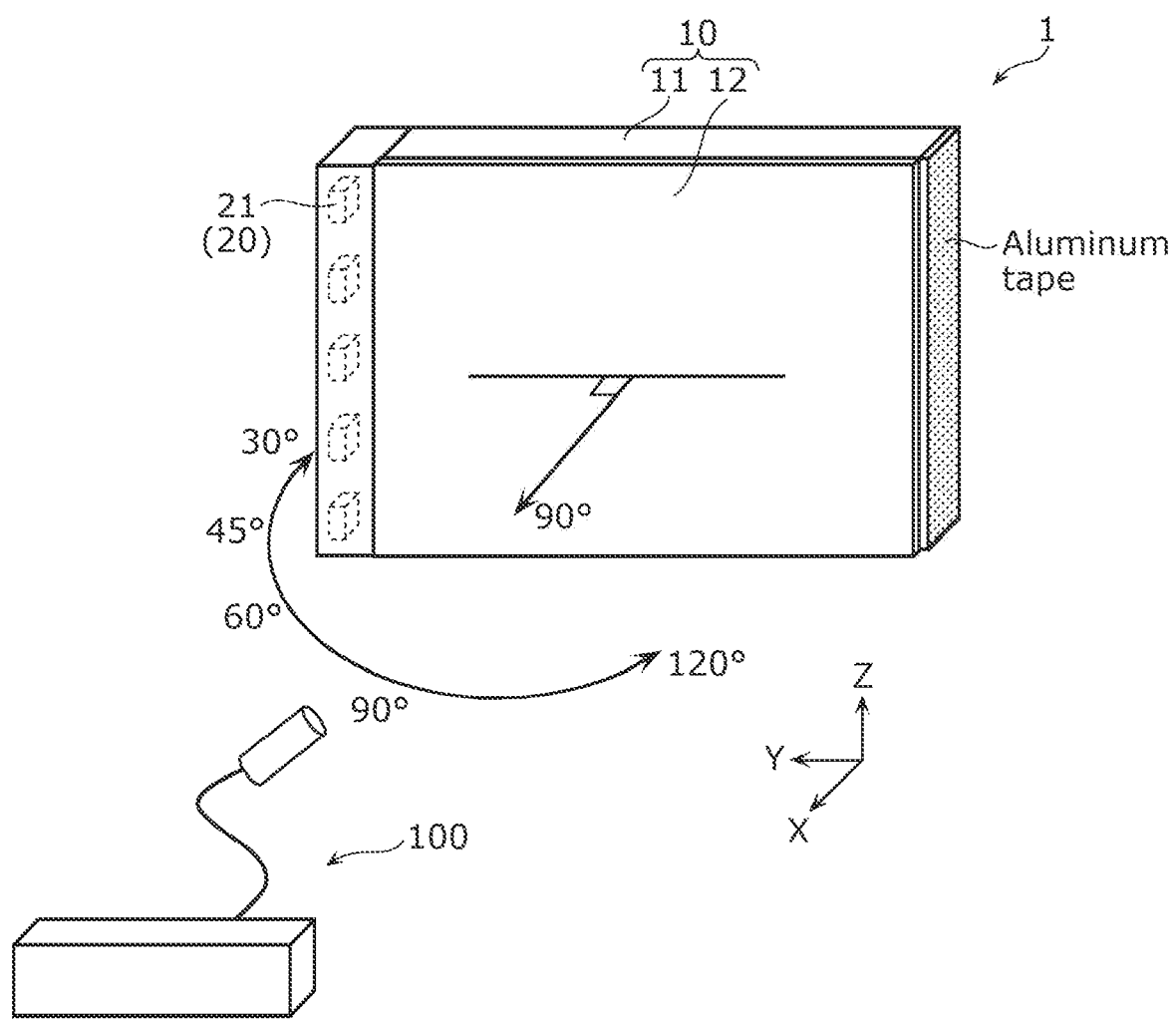
FIG. 10 illustrates an overview of an experiment to measure an emission spectrum of the light-emitting device.

FIG. 10 illustrates an overview of the present experiment. To perform the present experiment, aluminum tape was attached to second end surface 11d of light-emitting device 1 according to the present embodiment as illustrated in FIG. 10 so that no light is emitted from second end surface 11d. Then, light source 20, which was the line light source, emitted white light to the end surface of light guide 10 to cause light control layer 12 of light guide 10 to emit light. An emission spectrum of light control layer 12 at this time was measured using spectrophotometer 100 (MCPD-7000 from Otsuka Electronics Component., Ltd.). Furthermore, chromaticity of the emission spectrum was calculated, and emission intensity was also calculated. Here, in a measurement system of three-dimensional orthogonal coordinates of X, Y, and Z axes illustrated in FIG. 10, an X-axis direction orthogonal to the external surface of light control layer 12 corresponds to 90°, a positive direction of a Y-axis direction corresponds to 0°, and a negative direction of the Y-axis direction corresponds to 180°. Then, an emission spectrum was measured for each of measurement directions corresponding to angles of 30°, 45°, 60°, 90°, and 120°. Note that the measurement direction refers to a direction in which the user views light guide 10. Note also that the chromaticity is represented by chromaticity coordinates in the xy chromaticity diagram of the CIE 1931 color space. Although not illustrated, emission spectrums of light-emitting device 1X according to Comparative Example 1 were also measured according to the same way as used for light-emitting device 1 illustrated in FIG. 10 according to the present embodiment. Here, a transparent acrylic substrate having a thickness of 10 mm was used as light-transmissive member 11 for each of light-emitting device 1 according to the present embodiment and light-emitting 1X according to Comparative Example 1.

Figure 11:
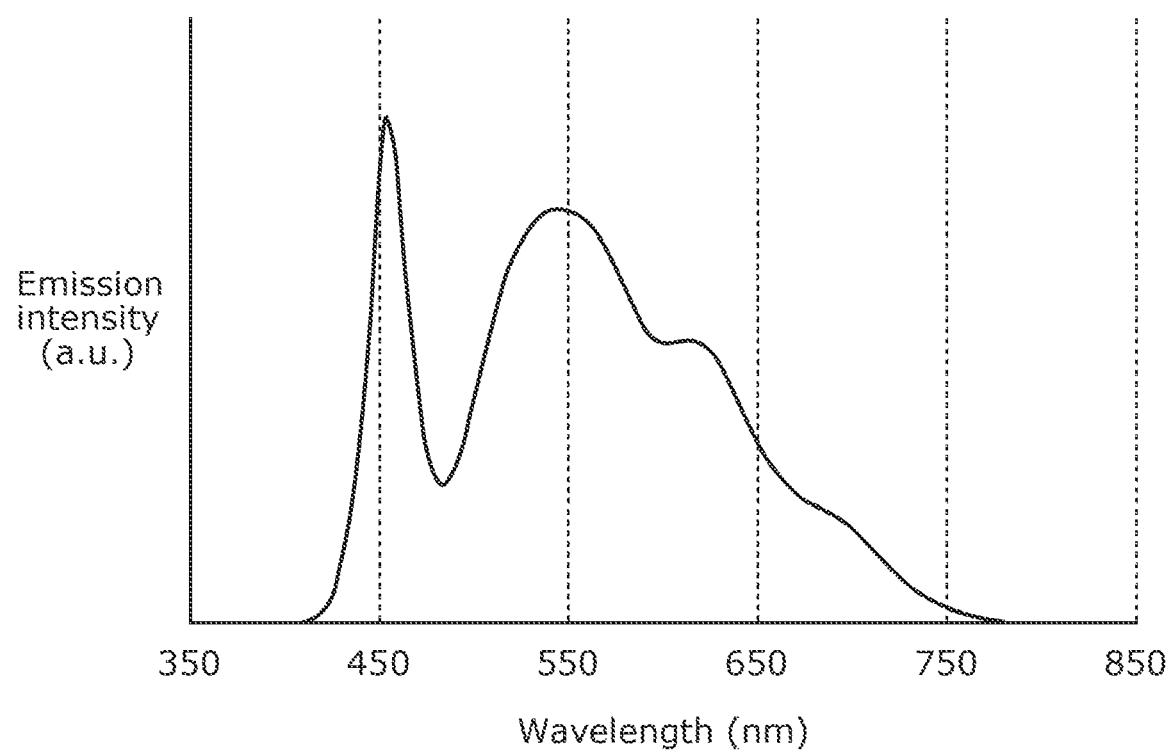
FIG. 11 illustrates an emission spectrum of a light source used in the experiment that is performed to measure the emission spectrum of the light-emitting device.

A white light source having an emission spectrum illustrated in FIG. 11 was used as light source 20 in the present experiment. To be more specific, light source 20 used in the present experiment is an LED module including a white LED element that includes, to emit white light: a blue light-emitting diode that emits blue light with an emission peak wavelength of about 455 nm; and a YAG phosphor that emits yellow-green fluorescence with an emission peak wavelength of about 545 nm, as illustrated in FIG. 11. Note that a red phosphor with an emission peak wavelength of about 615 nm is also added to the white LED element of light source 20.

Figure 12:
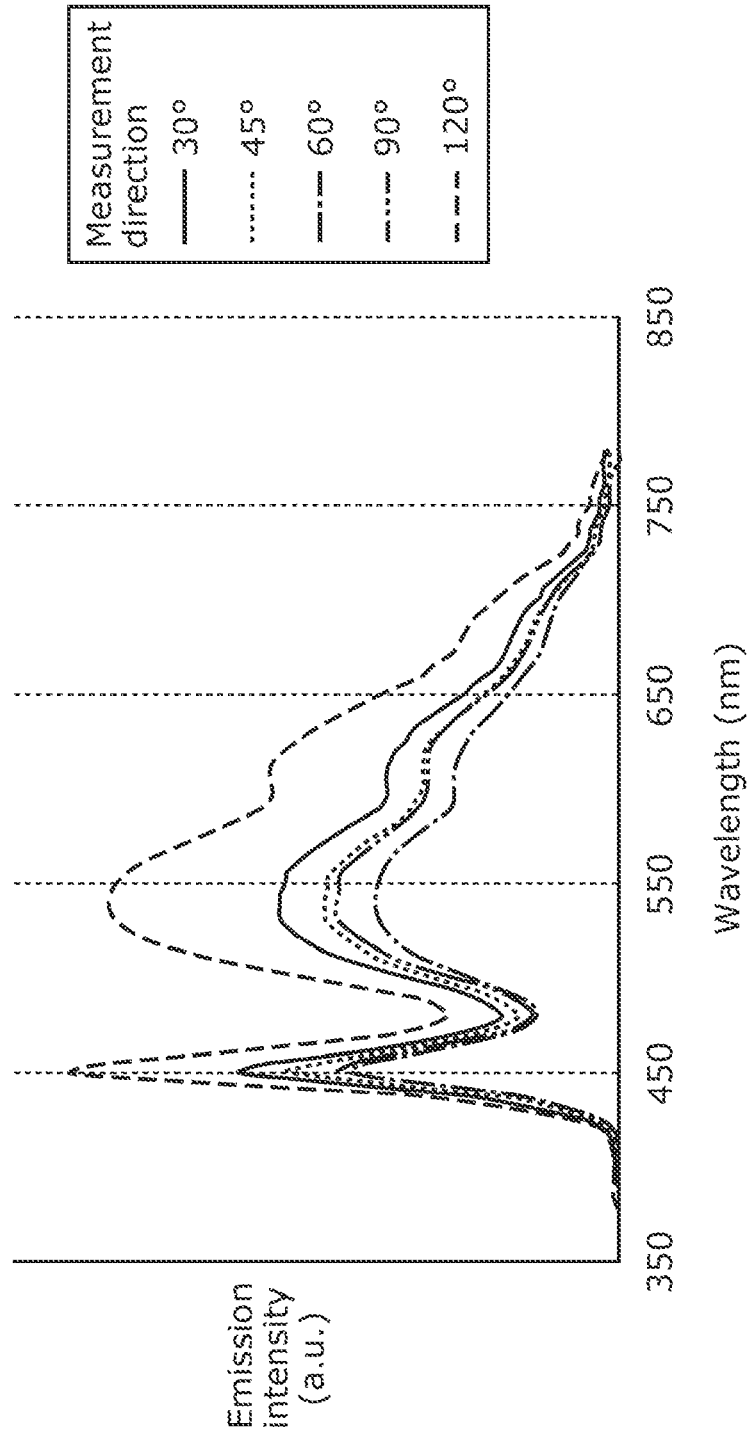
FIG. 12 illustrates emission spectrums of a light-emitting device according to Comparative Example 1.
Figure 13:
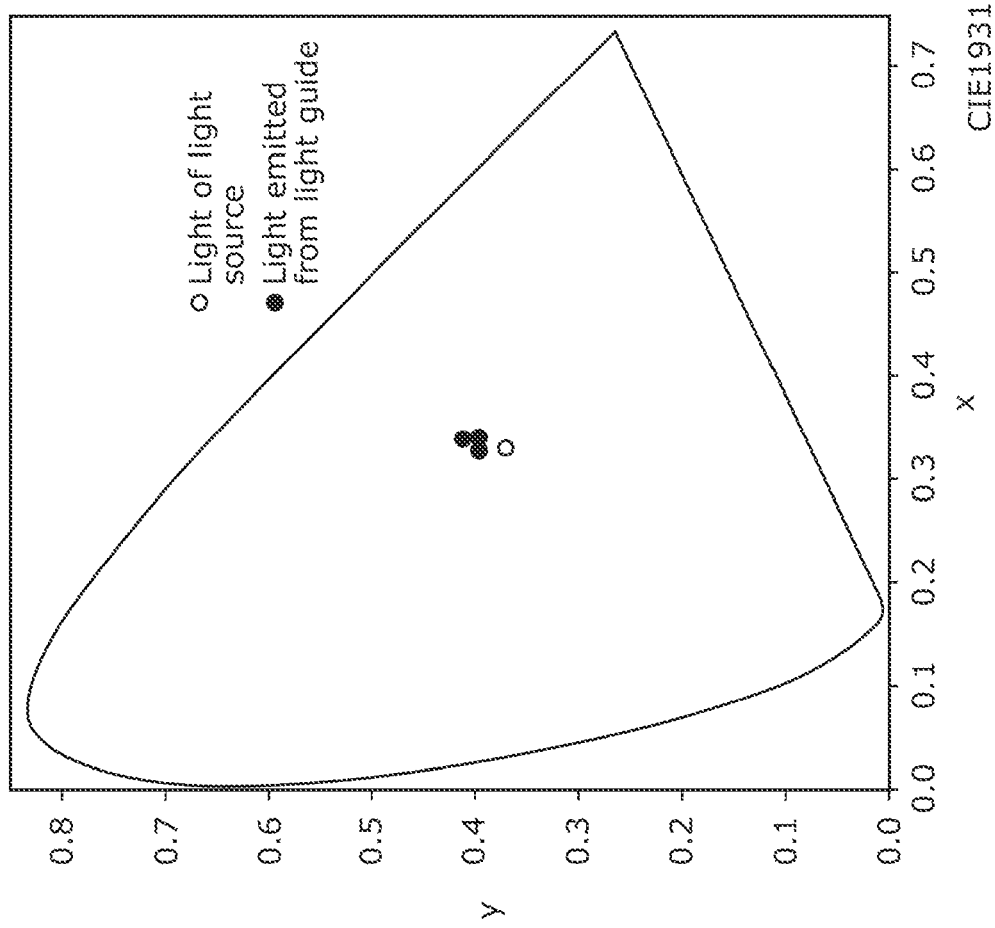
FIG. 13 illustrates chromaticities of the emission spectrums of the light-emitting device according to Comparative Example 1.

As a result of the measurement on light-emitting device 1X according to Comparative Example 1 under this condition, an emission spectrum illustrated in FIG. 12 and chromaticity illustrated in FIG. 13 were obtained for each of the measurement directions corresponding to the angles. As can be understood from FIG. 12 and FIG. 13, the emission spectrums and the chromaticities of light-emitting device 1X according to Comparative Example 1 have no angular dependence.

More specifically, the emission spectrums in FIG. 12 show that the emission peak wavelengths do not change with the angle in the measurement direction and are identical to the emission peak wavelength of the emission spectrum of light source 20. Moreover, as illustrated in the chromaticity diagram of FIG. 13, each of chromaticities at the angles in the measurement direction is not so different from the chromaticity of light source 20 and shows little change with the angle in the measurement direction.

In this way, the light from light guide 10X of light-emitting device 1X according to Comparative Example 1 appears substantially the same color, white, from any direction. To be more specific, the white light is extracted from light guide 10X without dependence on the angle.

Figure 14:
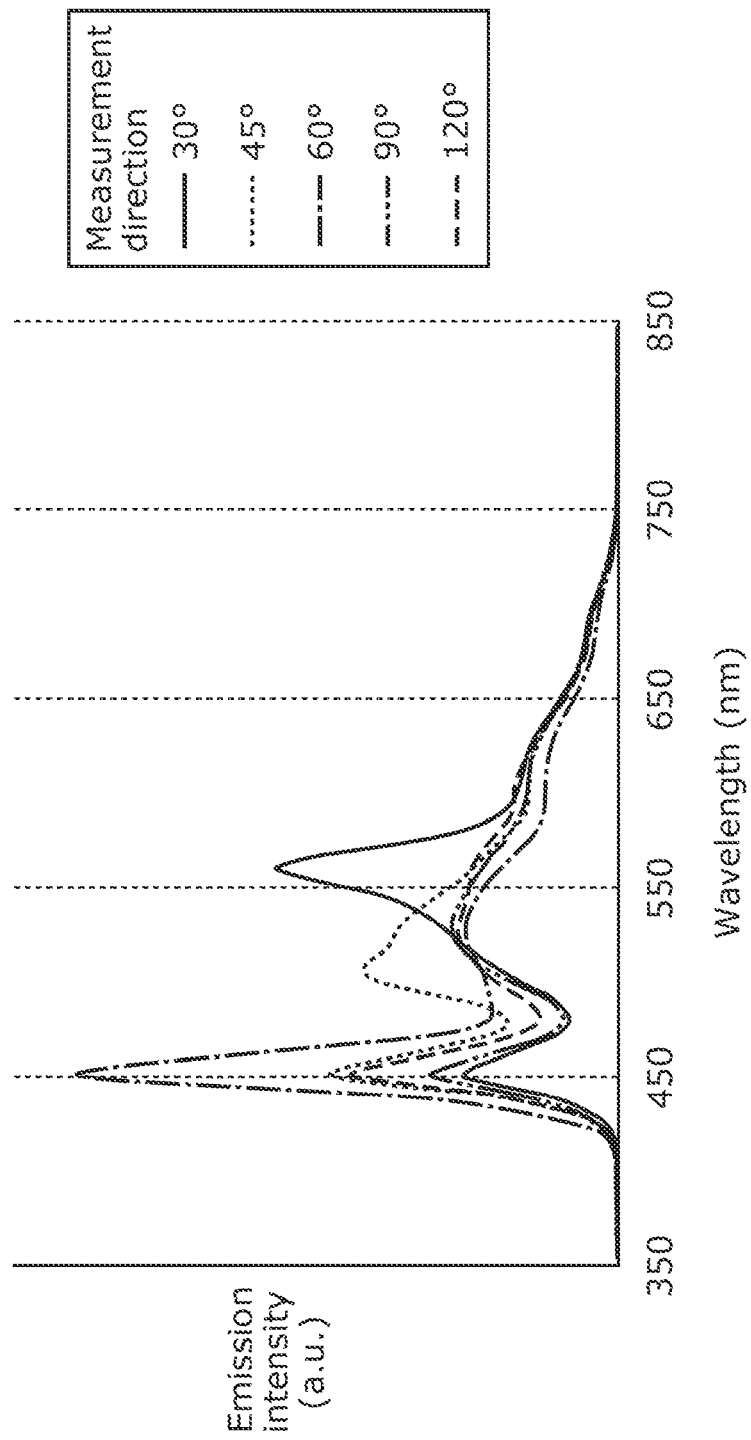
FIG. 14 illustrates emission spectrums of a light-emitting device according to Example 1.
Figure 15:
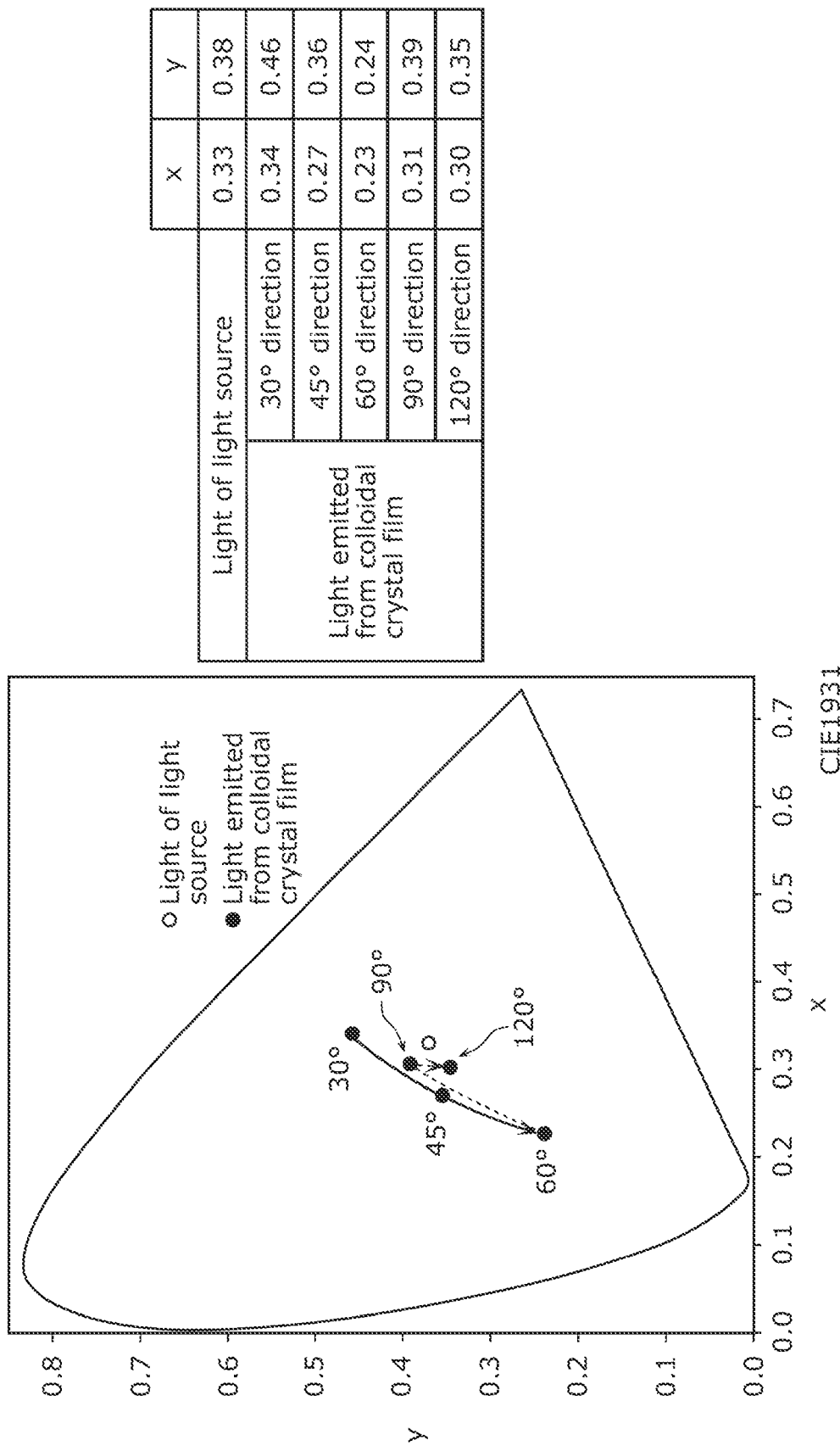
FIG. 15 illustrates chromaticities of the emission spectrums of the light-emitting device according to Example 1.

Meanwhile, for light-emitting device 1 that includes colloidal crystal film G as light control layer 12 according to Example 1, an emission spectrum illustrated in FIG. 14 and chromaticity illustrated in FIG. 15 were obtained for each of the measurement directions corresponding to the angles. As can be understood from FIG. 14 and FIG. 15, the emission spectrums and the chromaticities of light-emitting device 1 according to Example 1 have angular dependence.

More specifically, the emission spectrums in FIG. 14 show that a blue emission peak wavelength among a plurality of emission peak wavelengths does not change with the angle in the measurement direction. However, the other emission peak wavelengths among the plurality of emission peak wavelengths change with the angle in the measurement direction. Moreover, as illustrated in the chromaticity diagram of FIG. 15, each of chromaticities at the angles in the measurement direction changes with the angle in the measurement direction. In this case, the chromaticity changes beyond the white region, and changes with the angle in measurement direction in the following order, yellow-green region (30°), white region (45°), blue-violet region (60°), and then white region (90° and 120°).

In this way, the light from light guide 10 of light-emitting device 1 according to Example 1 appears different in color depending on the angle from which light guide 10 is viewed. To be more specific, the light in a color different depending on the angle is extracted from light guide 10. More specifically, the light that gradationally changes in color can be extracted as gradation light.

Figure 16:
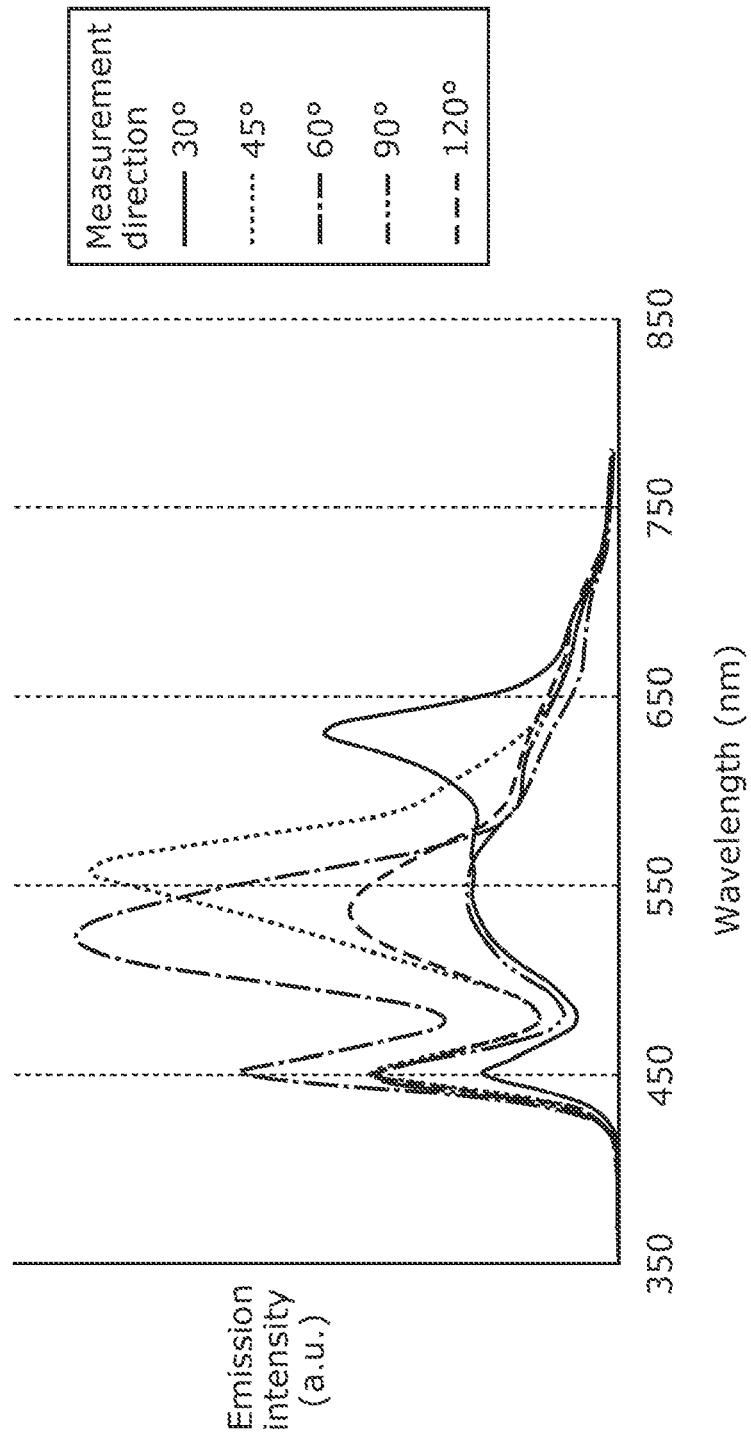
FIG. 16 illustrates emission spectrums of a light-emitting device according to Example 2.
Figure 17:
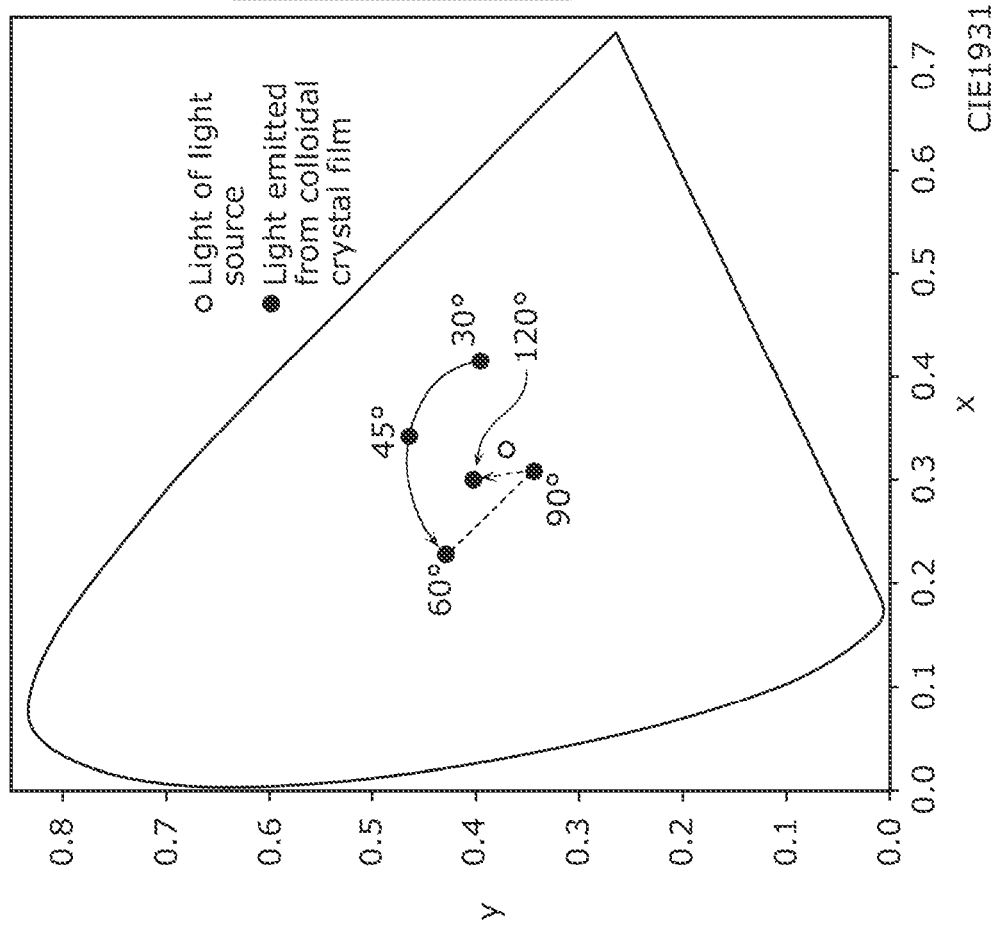
FIG. 17 illustrates chromaticities of the emission spectrums of the light-emitting device according to Example 2.

Meanwhile, for light-emitting device 1 that includes colloidal crystal film R as light control layer 12 according to Example 2, an emission spectrum illustrated in FIG. 16 and chromaticity illustrated in FIG. 17 were obtained for each of the measurement directions corresponding to the angles. As illustrated in FIG. 16 and FIG. 17, the emission spectrums and the chromaticities of light-emitting device 1 according to Example 2 also have angular dependence as with light-emitting device 1 according to Example 1.

More specifically, the emission spectrums in FIG. 16 show that a blue emission peak wavelength among a plurality of emission peak wavelengths does not change with the angle in the measurement direction. However, the other emission peak wavelengths among the plurality of emission peak wavelengths change with the angle in the measurement direction. Moreover, as illustrated in the chromaticity diagram of FIG. 17, each of chromaticities at the angles in the measurement direction changes with the angle in the measurement direction. In this case, the chromaticity changes beyond the white region, and changes with the angle in measurement direction in the following order, orange region (30°), yellow-green region (45°), blue-green region (60°), white region (90°), and then yellow-green region (120°). Thus, the light has a color when viewed from a more oblique direction. More specifically, the light that gradationally changes in color can be extracted as gradation light.

In this way, the light from light guide 10 of light-emitting device 1 according to Example 2 also appears different in color depending on the angle from which light guide 10 is viewed, as with light-emitting device 1 according to Example 1. To be more specific, the light of a color different depending on the angle is extracted from light guide 10.

Figure 18:
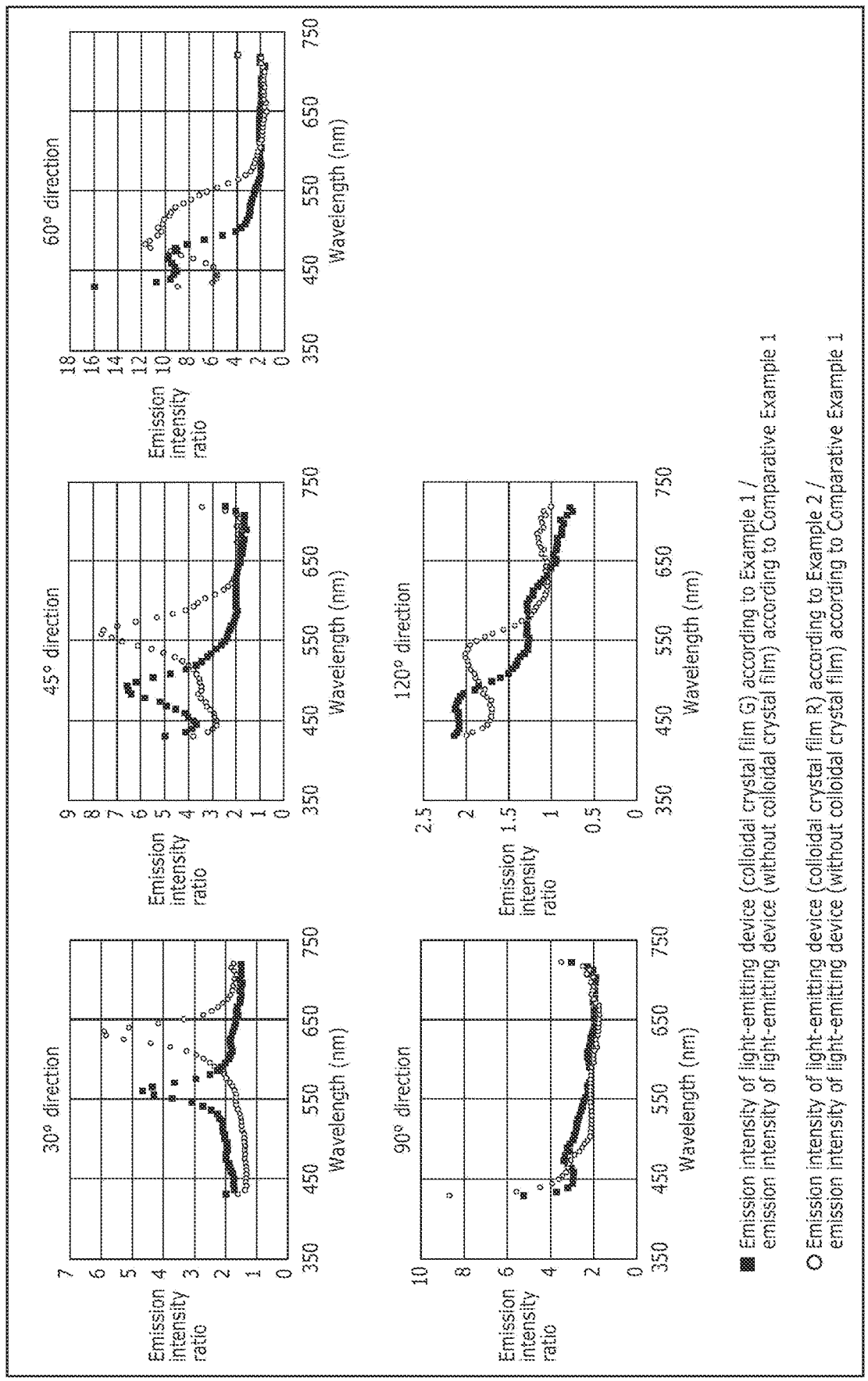
FIG. 18 illustrates angular dependence of emission intensity of light extracted from the light control layers of the light-emitting devices according to Examples 1 and 2.

FIG. 18 illustrates angular dependence of emission intensity of the light extracted from light control layers 12 of light-emitting devices 1 according to Examples 1 and 2. FIG. 18 illustrates an emission spectrum of the emission intensity for each of light-emitting devices 1 according to Examples 1 and 2 with respect to light-emitting device 1X according to Comparative Example 1 (that is, illustrates emission intensity ratios). These ratios are based on the emission intensities measured, using spectrophotometer 100, on light-emitting devices 1 according to Examples 1 and 2 and light-emitting device 1X according to Comparative Example 1, for each of the measurement directions corresponding to 30°, 45°, 60°, 90°, and 120°. In FIG. 18, a filled rectangle represents emission intensity obtained by dividing the emission intensity of light-emitting device 1 according to Example 1 by the emission intensity of light-emitting device according to Comparative Example 1. Moreover, an open circle represents emission intensity obtained by dividing the emission intensity of light-emitting device 1 according to Example 2 by the emission intensity of light-emitting device according to Comparative Example 1.

As illustrated in FIG. 18, light control layer 12 formed of the colloidal crystal film and disposed on light-transmissive member 11 enables the extraction of the light with a specific wavelength corresponding to an angle in the measurement direction. This increases the extraction efficiency of the light emitted from light guide 10. Here, the wavelength of the extracted light is different depending on a composition of the colloidal crystal film.

More specifically, the light extraction efficiency of each of light-emitting devices 1 according to Examples 1 and 2 increases at all wavelengths in the visible light region in the measurement direction at a 30° angle, as compared with light-emitting device 1X according to Comparative Example 1. As illustrated, the light extraction efficiency of light-emitting device 1 according to Example 1 significantly increases particularly when the light with the peak wavelength of about 555 nm is steeply extracted. As also illustrated, the light extraction efficiency of light-emitting device 1 according to Example 2 significantly increases particularly when the light with the peak wavelength of about 640 nm is steeply extracted.

Moreover, the light extraction efficiency of each of light-emitting devices 1 according to Examples 1 and 2 also increases at all wavelengths in the visible light region in the measurement direction at an angle of 45°, as compared with light-emitting device 1X according to Comparative Example 1. As illustrated, the light extraction efficiency of light-emitting device 1 according to Example 1 significantly increases particularly when the light with the peak wavelength of about 470 nm is steeply extracted. As also illustrated, the light extraction efficiency of light-emitting device 1 according to Example 2 significantly increases particularly when the light with the peak wavelength of about 555 nm is steeply extracted.

Furthermore, the light extraction efficiency of each of light-emitting devices 1 according to Examples 1 and 2 also increases at all wavelengths in the visible light region in the measurement direction at an angle of 60°, as compared with light-emitting device 1X according to Comparative Example 1. As illustrated, the light extraction efficiency of light-emitting device 1 according to Example 1 significantly increases particularly when the light with the peak wavelength of about 460 nm is steeply extracted. As also illustrated, the light extraction efficiency of light-emitting device 1 according to Example 2 significantly increases particularly when the light with the peak wavelength of about 470 nm is steeply extracted.

Furthermore, the light extraction efficiency of each of light-emitting devices 1 according to Examples 1 and 2 also increases at all wavelengths in the visible light region in the measurement direction at a 90° angle, as compared with light-emitting device 1X according to Comparative Example 1.

Furthermore, the light extraction efficiency of each of light-emitting devices 1 according to Examples 1 and 2 increases at wavelengths of 600 nm or less in the visible light region in the measurement direction at a 120° angle, as compared with light-emitting device 1X according to Comparative Example 1. As illustrated, the light extraction efficiency of light-emitting device 1 according to Example 1 significantly increases particularly when the light with the peak wavelength of 500 nm or less in the visible light region is extracted. As also illustrated, the light extraction efficiency of light-emitting device 1 according to Example 2 significantly increases particularly when the light with the peak wavelength of about 540 nm is extracted.

According to the present embodiment as described above, a positional relationship is devised in light-emitting device 1 among light control layer 12 having the reflected-wavelength selectivity, light-transmissive member 11 that is light-transmissive, and light source 20. To be more specific, light guide 10 includes light control layer 12 that is disposed on at least a part of the surface of light-transmissive member 11. Moreover, light source 20 is positioned to emit light toward first end surface 11a of light-transmissive member 11.

With this configuration, the light emitted from light source 20 enters light-transmissive member 11 from first end surface 11a, and then is guided in light-transmissive member 11 to enter light control layer 12. Here, light control layer 12 has the reflected-wavelength selectivity that makes a wavelength of reflected light dependent on an incident angle of incident light. Thus, the light entering light control layer 12 from light-transmissive member 11 receives the optical action by this reflected-wavelength selectivity of light control layer 12 and then is emitted from light guide 10. As a result, the light emitted from light guide 10 varies in color depending on an angle from which light guide 10 is viewed. More specifically, an emission color of light guide 10 changes according to the angle of view. In this way, light guide 10 of light-emitting device 1 according to the present embodiment changes in color depending on the angle of view. This achieves a new method of extracting light with a specific wavelength different depending on the angle of view. For example, the method can extract, as gradation light, the light that gradationally changes in color in response to a change in the angle of view.

Light control layer 12 of light-emitting device 1 according to the present embodiment in particular has the three-dimensional periodic structure. More specifically, light control layer 12 is formed of the colloidal crystal film including the colloidal crystal.

With this, the light entering light control layer 12 from light-transmissive member 11 is diffracted by the three-dimensional periodic structure of light control layer 12 and thereby results in diffracted light with a specific wavelength according to an angle. This allows the light with the specific wavelength different depending on the angle of view to be extracted from light guide 10.

For example, colloidal crystal film R having the reflectance spectrums illustrated in FIG. 3B is used as light control layer 12. In this case, white light from light source 20 is emitted to light-transmissive member 11 and then enters light control layer 12. This light thereby results in diffracted light, including red light, green light, and blue light, with wavelengths from the blue region to the red region. Thus, light guide 10 appears red, green, or blue, depending on the angle of view.

As described above, the light is incident from first end surface 11a of light-transmissive member 11 to first main surface 11b on which the colloidal crystal film is disposed, which enables the extraction of the light with a specific wavelength depending on the angle. This finding made by the inventors is non-conventional and innovative.

Moreover, it has been also found that the light with a wavelength shorter than a specular reflection wavelength can be extracted using light control layer 12 formed of the colloidal crystal film. Here, colloidal crystal film G having the reflectance spectrums illustrated in FIG. 3A is used as light control layer 12. In this case, white light from light source 20 is emitted to light-transmissive member 11 and then enters light control layer 12 to result in diffracted light including green light and blue light. Thus, light guide 10 appears green or blue depending on the angle of view. However, in this case, the light entering light control layer 12 does not result in red diffracted light and thus the red light is confined in light-transmissive member 11 without being emitted to the outside from light control layer 12. In the present embodiment, the red light confined in light-transmissive member 11 is to be emitted to the outside from second end surface 11d of light-transmissive member 11.

Thus, light-emitting device 1 according to the present embodiment enables the light extraction by a new method. More specifically, the light with a specific wavelength included in the light entering light-transmissive member 11 is emitted from light control layer 12. Furthermore, the light of a different specific wavelength is selectively confined in light-transmissive member 11 and is emitted to the outside from a section of light-transmissive member 11 that is different from the location of light control layer 12. This allows the light emitted from light source 20 to be divided according to the wavelengths. In this case, the transmission of the confined light allows the light-emitting device to function as both a lighting device and an optical transmission device.

As described above, the composition of the colloidal crystal film is devised. With this, when the light is incident from first end surface 11a of light-transmissive member 11 to first main surface 11b on which the colloidal crystal film is disposed, the light with a specific wavelength is emitted from the colloidal crystal film while the light with a different specific wavelength is confined. This finding made by the inventors is also non-conventional and innovative.

Moreover, it has been also found that light-emitting device 1 according to the present embodiment is capable of not only extracting light with a specific wavelength and confining light with a different specific wavelength depending on the angle of view, but also increasing the light extraction efficiency as described above. More specifically, the light extraction is achieved by a new method that, while increasing the light extraction efficiency, extracts light with a specific wavelength and confines light with a different specific wavelength depending on the angle of view.

As described above, the light extraction efficiency increases for the light incident from first end surface 11a of light-transmissive member 11 to first main surface 11b on which the colloidal crystal film is disposed. This finding made by the inventors is also non-conventional and innovative.

Furthermore, the colloidal crystal film can be made by a coating process. This allows light control layer 12 large in area to be easily made. Thus, the use of the colloidal crystal film can easily increase light-emitting device 1 in area. Moreover, the colloidal crystal film can be made at low cost without any special microfabrication process. This allows light-emitting device 1 that changes in color depending on the angle of view to be manufactured at low cost.

Furthermore, light control layer 12 formed of the colloidal crystal film may have a thickness between 5 μm and 100 μm inclusive.

If the colloidal crystal film is too thin, the optical action by diffraction cannot be produced well. On the other hand, if the colloidal crystal film is too thick, the nanoparticles cannot be arranged periodically well, which reduces the transmittance of the colloidal crystal film. This reduces a design property and light extraction efficiency. From this perspective, light control layer 12 formed of the colloidal crystal film may have a thickness between 5 μm and 100 μm inclusive.

Furthermore, the colloidal crystal film used as light control layer 12 has the specific specular reflected wavelength as well as the reflected-wavelength region in a specific range, as described above. In this case, the reflected-wavelength region and the specular reflected wavelength of the colloidal crystal film is changed by changing the average diameter of nanoparticles 12*a* included in light control layer 12 according to the present embodiment. However, this is not intended to be limiting. For example, the concentration of nanoparticles 12*a* included in the colloidal crystal film (light control layer 12) may be changed, the material used to make nanoparticles 12*a* included in the colloidal crystal film (light control layer 12) may be changed, or a plurality of groups of nanoparticles 12*a* with different average diameters may be used. Alternatively, a combination of these changes may change the reflected-wavelength region and the specular reflected wavelength of the colloidal crystal film. In other words, the reflected-wavelength region and the specular reflected wavelength of the colloidal crystal film can be freely designed. In this case, the light with the wavelength shorter than the specular reflection wavelength can be extracted from the colloidal crystal film as described above. For example, to increase magnitude of the color change of visible light, a colloidal crystal film may be made to have a reflected-wavelength region from the red region to the near-infrared region (610 nm to 900 nm). To reduce the magnitude of the color change, a colloidal crystal film may be made to have a reflected-wavelength region from the blue-green region to the orange region (500 nm to 600 nm).

The particle arrangement in the colloidal crystal of the colloidal crystal film may have a three-dimensional periodic structure with or without complete periodicity. The colloidal crystal having the complete periodicity causes light to be diffracted strongly in a specific direction due to a relationship between a wavelength and the periodicity of the particle arrangement. This enables the light-emitting device to have high magnitude of the color change depending on the angle of view. On the other hand, the colloidal crystal having the particle arrangement that is moderately irregular in part, instead of having a completely periodic arrangement, causes light to be diffracted weakly in a specific direction. This enables the light-emitting device to have low magnitude of the color change.

Note that a concept of the colloidal crystal of the colloidal crystal film according to the present embodiment may include colloidal solid solution. This colloidal solid solution includes nanoparticles colloidally crystalized and thus has a crystal structure similar to that of a solid solution. Thus, the nanoparticles, which are colloidal particles, form a regular arrangement structure to be an ensemble like a solid solution.

Although light control layer 12 according to the present embodiment is disposed directly on light-transmissive member 11, this is not intended to be limiting. For example, light control layer 12 may be a light control sheet including a transparent substrate, such as a transparent film, on which a light control film formed of a colloidal crystal film is disposed. In this case, this light control sheet may be attached to light-transmissive member 11 with an adhesive for instance.

Figure 19:
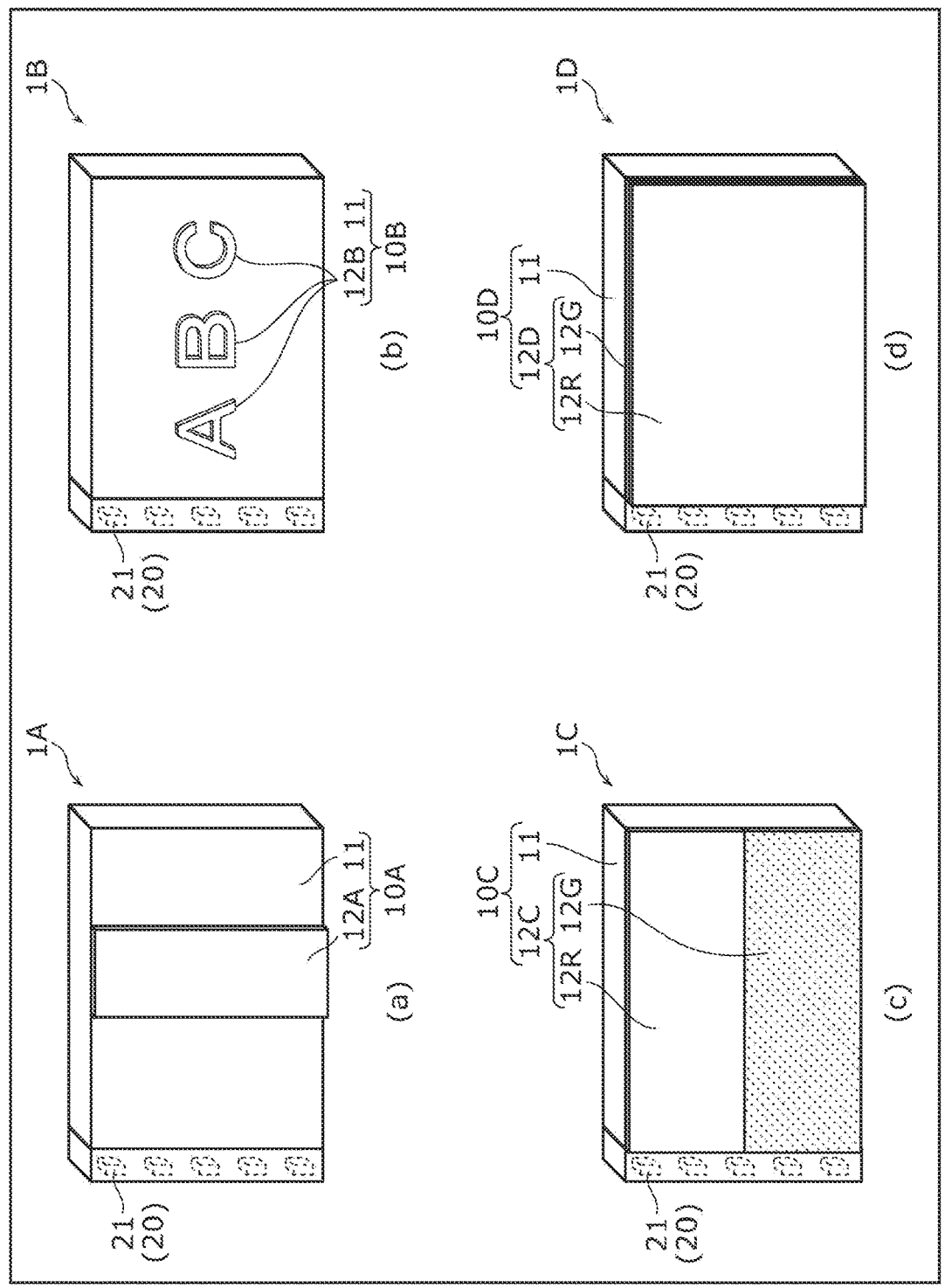
FIG. 19 is a perspective view of a light-emitting device according to a variation of Embodiment 1.

Although light control layer 12 according to the present embodiment is disposed all over first main surface 11*b* of light-transmissive member 11, this is not intended to be limiting. Light control layer 12 may be disposed on a part of the surface of light-transmissive member 11. For example, as illustrated in (a) of FIG. 19, light-emitting device 1A may include light guide 10A including light control layer 12A that is rectangular and disposed on a part of first main surface 11*b* of light-transmissive member 11. As illustrated in (b) of FIG. 19, light-emitting device 1B may include light guide 10B including light control layer 12B that is shaped in a pattern, such as a character or a design, and is disposed on a part of first main surface 11*b* of light-transmissive member 11.

Although light control layer 12 disposed on light-transmissive member 11 according to present embodiment is either colloidal crystal film G or colloidal crystal film R, this is not intended to be limiting. For example, as illustrated in (c) of FIG. 19, light-emitting device 1C may include light guide 10C. Light guide 10C includes light control layer 12C including first light control layer 12R formed of colloidal crystal film R and second light control layer 12G formed of colloidal crystal film G that are disposed side by side on first main surface 11*b* of light-transmissive member 11. Alternatively, as illustrated in (d) of FIG. 19, light-emitting device 1D may include light guide 10D. Light guide 10D includes light control layer 12D that is a multi-layer film including first light control layer 12R formed of colloidal crystal film R and second light control layer 12G formed of colloidal crystal film G that are stacked on first main surface 11*b* of light-transmissive member 11. More specifically, light control layer 12C may be a multi-layer film including a plurality of light control films stacked, each having the reflected-wavelength selectivity. This achieves a light-emitting device that provides various color changes according to the angle of view.

Embodiment 2

Figure 20:
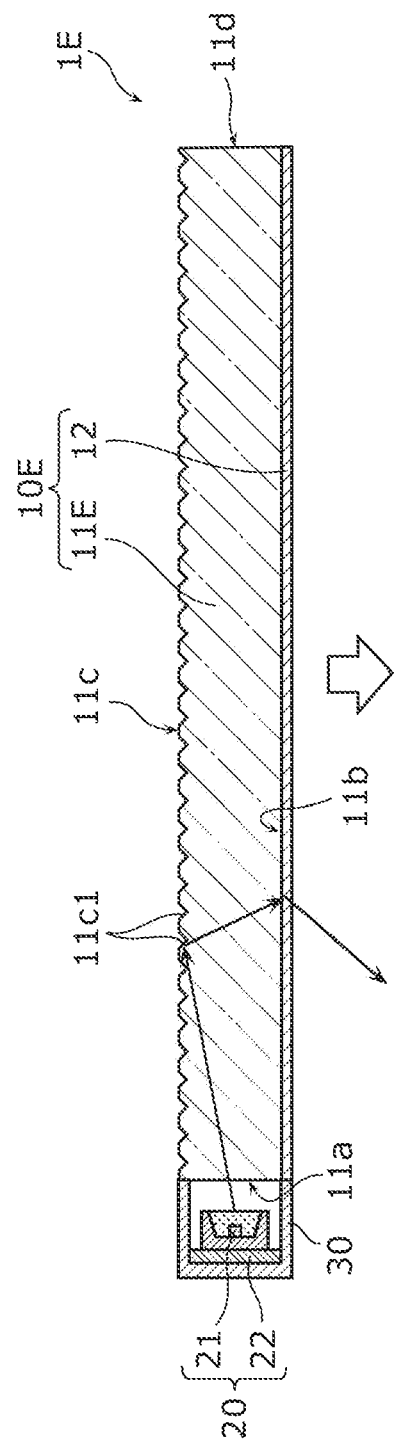
FIG. 20 is a cross-sectional view of a light-emitting device according to Embodiment 2.

Next, light-emitting device 1E according to Embodiment 2 is described, with reference to FIG. 20. FIG. 20 is a cross-sectional view of light-emitting device 1E according to Embodiment 2.

As illustrated in FIG. 20, light-emitting device 1E according to the present embodiment is different from light-emitting device 1 according to Embodiment 1 in that a reflector that reflects light guided in light-transmissive member 11 toward first main surface 11*b* is disposed on second main surface 11*c* of light-transmissive member 11.

More specifically, light-emitting device 1E according to the present embodiment includes light guide 10E and light source 20. Light guide 10E includes: light-transmissive member 11E including a reflector that reflects light guided in light-transmissive member 11E toward first main surface 11*b*; and light control layer 12. In the present embodiment, a plurality of recesses 11c1 formed in second main surface 11c of light-transmissive member 11E are used as the reflector that reflects the light guided in light-transmissive member 11E toward first main surface 11b refers to.

To be more specific, each of the plurality of recesses 11c1 is a reflective prism having a reflective surface that reflects the light guided in light-transmissive member 11E toward first main surface 11b. Each of the plurality of recesses 11c1 is a fine recess formed by surface treatment on second main surface 11c of light-transmissive member 11E using a laser or by etching for instance. As an example, each of the plurality of recesses 11c1 is triangular in cross section and has a shape of a cone, a triangular prism, a triangular pyramid, or a square pyramid, for example. Note that light-transmissive member 11E according to the present embodiment is identical to light-transmissive member 11 according to Embodiment 1 except for the plurality of recesses 11c1.

As described above, light-emitting device 1E according to the present embodiment includes light guide 10E and light source 20, similarly to light-emitting device 1 according to Embodiment 1. Light guide 10E includes light control layer 12 disposed on at least a part of the surface of light-transmissive member 11E. Light source 20 is positioned to emit light toward first end surface 11a of light-transmissive member 11E.

This configuration of light-emitting device 1E according to the present embodiment achieves the same advantageous effects as those achieved by light-emitting device 1 according to Embodiment 1. For example, the advantageous effects include extraction of light with a specific wavelength different depending on the angle of view, confinement of light with a specific wavelength, and enhancement of the light extraction efficiency.

In addition, light-emitting device 1E according to the present embodiment includes the plurality of recesses 11c1, as the reflector, that are formed in second main surface 11c of light-transmissive member 11E to reflect the light guided in light-transmissive member 11E toward first main surface 11b and. This allows more light to enter light control layer 12 from light-transmissive member 11 and thereby allows more light to be extracted to the outside of light guide 10 from light control layer 12, as compared with light-emitting device 1 according to Embodiment 1. Thus, the light extraction efficiency of light-emitting device 1E is further enhanced, as compared with light-emitting device 1 according to Embodiment 1.

Figure 21:
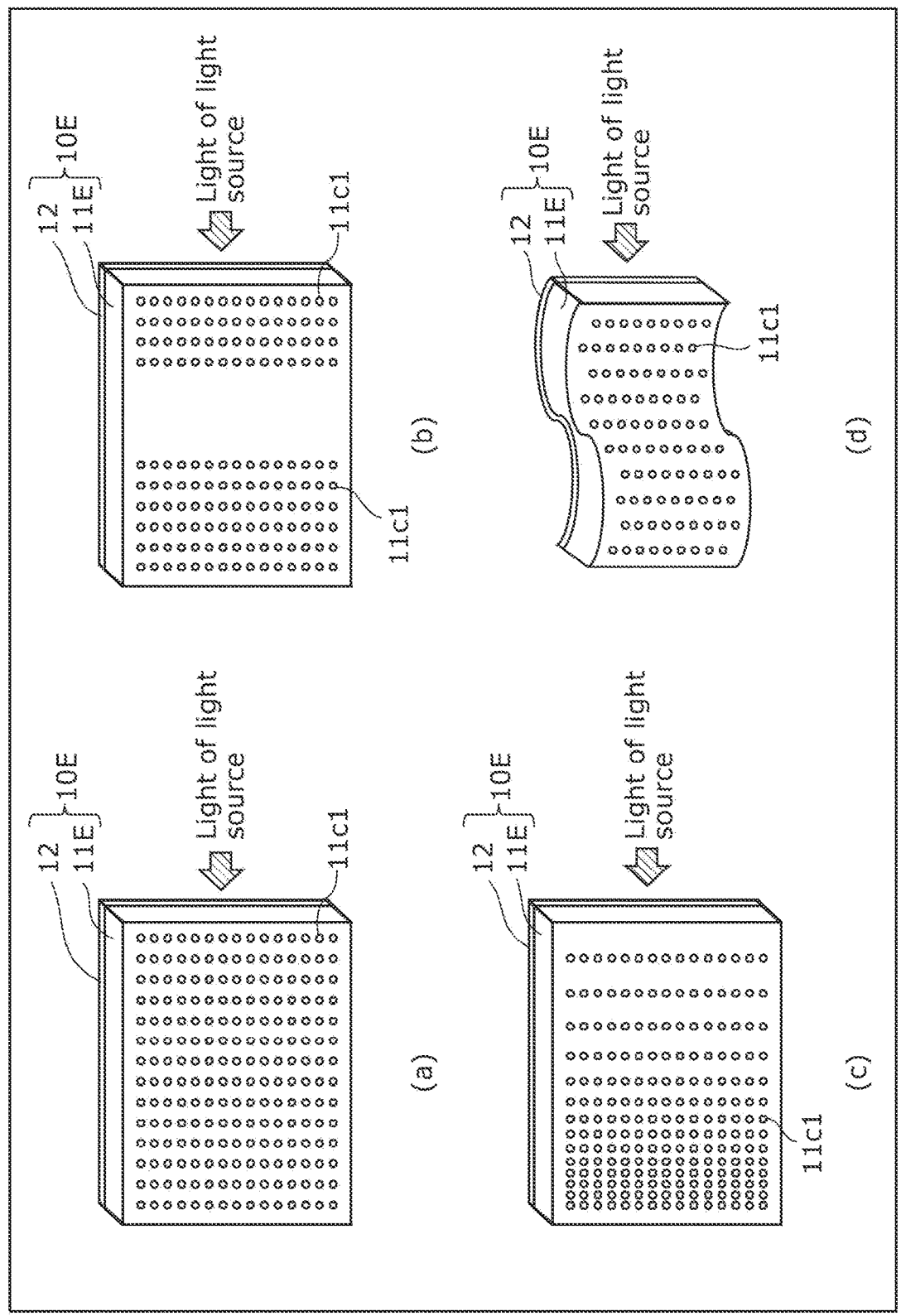
FIG. 21 is a perspective view of a light-emitting device viewed from the back, according to a variation of Embodiment 2.

In the present embodiment, the plurality of recesses 11c1 are formed with regular dot pitches uniformly all over second main surface 11c as illustrated in (a) of FIG. 21. However, this is not intended to be limiting. For example, as illustrated in (b) and (c) of FIG. 21, the plurality of recesses 11c1 may be formed on a part of second main surface 11c by, for example, changing the density distribution. In this case, second main surface 11c may include a region where recesses 11c1 are formed and a region where recesses 11c1 are not formed, as illustrated in (b) of FIG. 21 for example. This allows more light to be emitted from a part of light control layer 12 (light guide 10E) that is opposed to the region where recesses 11c1 are formed and thereby partially increases luminance of light-emitting device 1E. On the other hand, the distribution density of the plurality of recesses 11c1 may increase, that is, change from more sparse distribution to more dense distribution, with distance from light source 20, as illustrated in (c) of FIG. 21. This allows light to be extracted uniformly from the whole of light guide 10E and thereby increases luminance uniformity of light-emitting device 1E. For light-transmissive member 1E in the form of a film as illustrated in (d) of FIG. 21, the plurality of recesses 11c1 may be formed in second main surface 11c that is curved. This allows the luminance of light-emitting device 1E to be partially changed. In this way, the pattern of the plurality of recesses 11c1 may be devised so that the light can be extracted uniformly from the whole of light guide 10E, that the luminance can be partially increased for the light extraction, or that the amount of light to be extracted can be changed depending on a section.

In the present embodiment, the plurality of recesses 11c1 formed in second main surface 11c of light-transmissive member 11E are used as the reflector that reflects the light guided in light-transmissive member 11E toward first main surface 11b. However, this is not intended to be limiting. For example, a plurality of reflective dots printed on second main surface 11c of light-transmissive member 11E may be used as the reflector that reflects the light guided in light-transmissive member 11E toward first main surface 11b.

[Variations]

The light-emitting device according to the present invention has been described by way of Embodiments 1 and 2. However, the present invention is not limited to Embodiments 1 and 2 described above.

Figure 22:
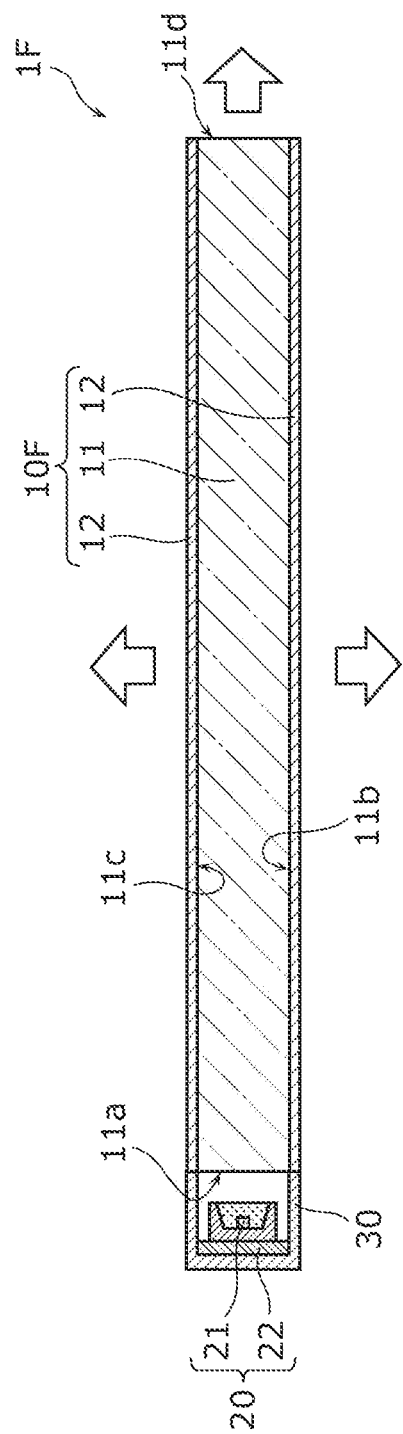
FIG. 22 is a cross-sectional view of a light-emitting device according to Variation 1.

For example, light control layer 12 is disposed on only one surface, that is, first main surface 11b of light-transmissive members 11 and 11E according to Embodiments 1 and 2 described above. However, this is not intended to be limiting. To be more specific, as illustrated in FIG. 22, light control layer 12 of light-emitting device 1F may be disposed on each of first main surface 11b and second main surface 11c of light-transmissive member 11. More specifically, light guide 10F of light-emitting device 1F according to the present variation includes light control layer 12 disposed on both first main surface 11b and second main surface 11c of light-transmissive member 11. This configuration enhances the extraction efficiency of light with a specific wavelength to be extracted according to an angle of view. Moreover, the light with a specific wavelength can be emitted from light control layer 12 while light with a different specific wavelength can be confined at an increased effect of the light confinement. Note that light control layer 12 disposed on first main surface 11b may or may not be the same as light control layer 12 disposed on second main surface 11c. For example, both of light control layers 12 disposed on first main surface 11b and second main surface 11c may be the same, colloidal crystal films R or colloidal crystal films G. Alternatively, light control layer 12 disposed on first main surface 11b may be one of colloidal crystal film R and colloidal crystal film G, and then light control layer 12 disposed on second main surface 11c may be the other one of colloidal crystal film R and colloidal crystal film G.

Figure 23:
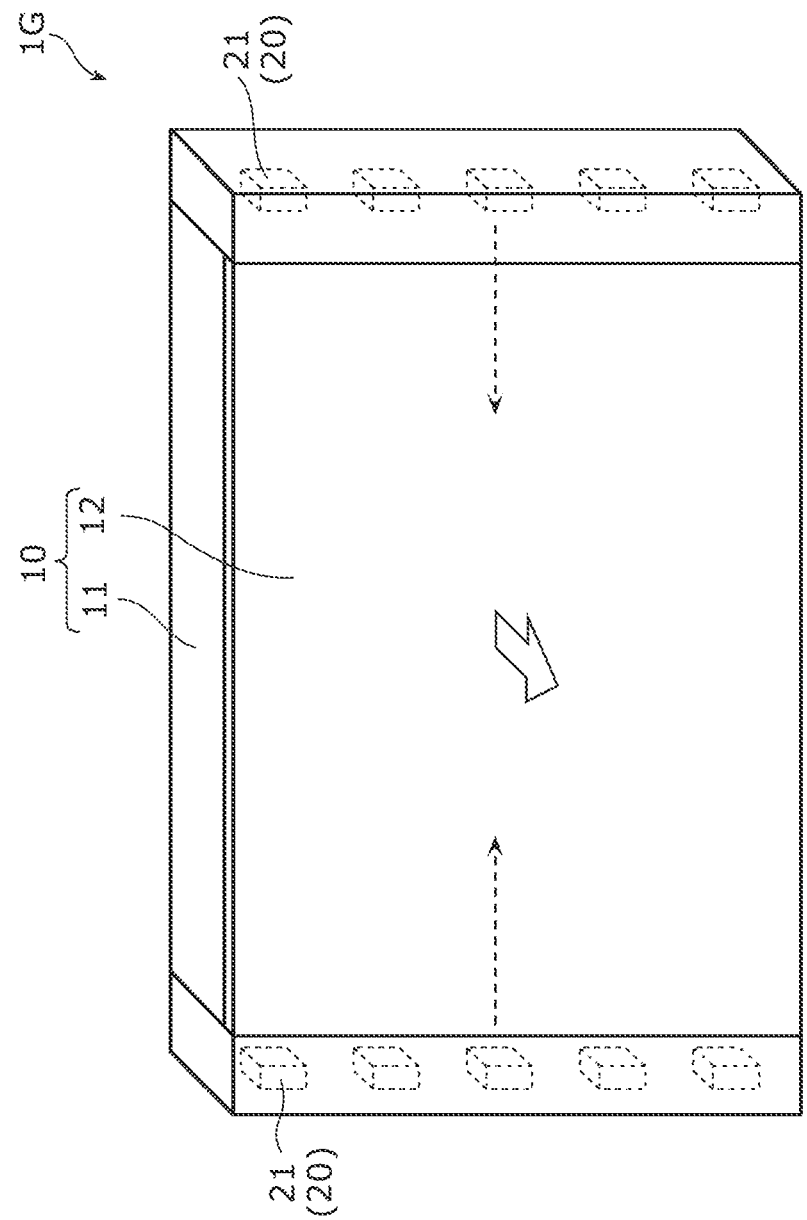
FIG. 23 is a perspective view of a light-emitting device according to Variation 2.
Figure 24:
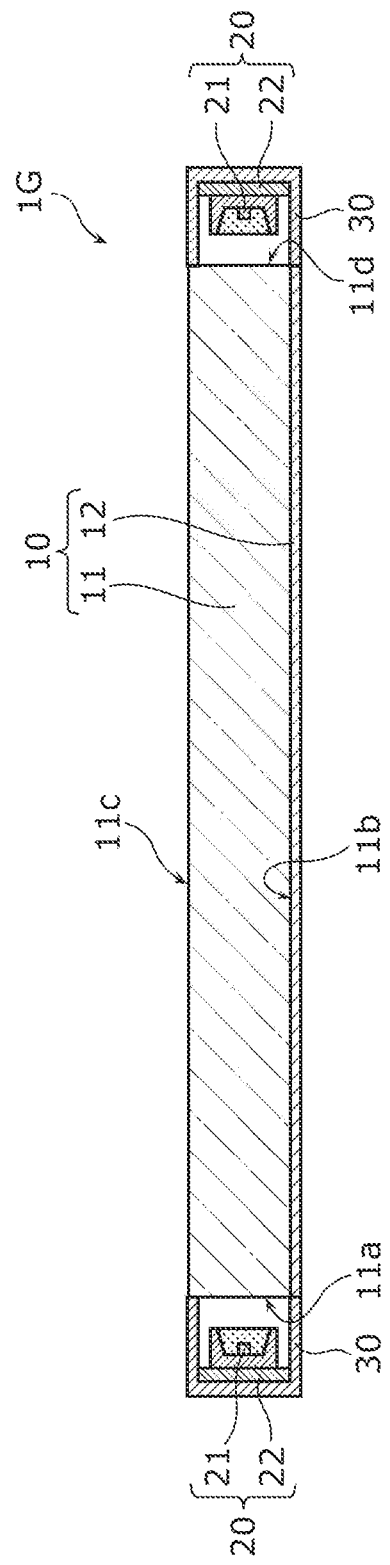
FIG. 24 is a cross-sectional view of the light-emitting device according to Variation 2.

Although only one light source 20 is included according to Embodiments 1 and 2 described above, more than one light source 20 may be included. As illustrated in FIG. 23 and FIG. 24, light-emitting device 1G may include two light sources 20. In this case, one of light sources 20 may be disposed opposite to first end surface 11a of light-transmissive member 11, and the other one of light sources 20 may be disposed opposite to second end surface 11d of light-transmissive member 11. This allows light to enter light-transmissive member 11 from the right and left end surfaces, that is, from first end surface 11a and second end surface 11d of light-transmissive member 11. As a result, a horizontally symmetrical change can be achieved in the chromaticity of the light extracted from light guide 10.

Figure 25:
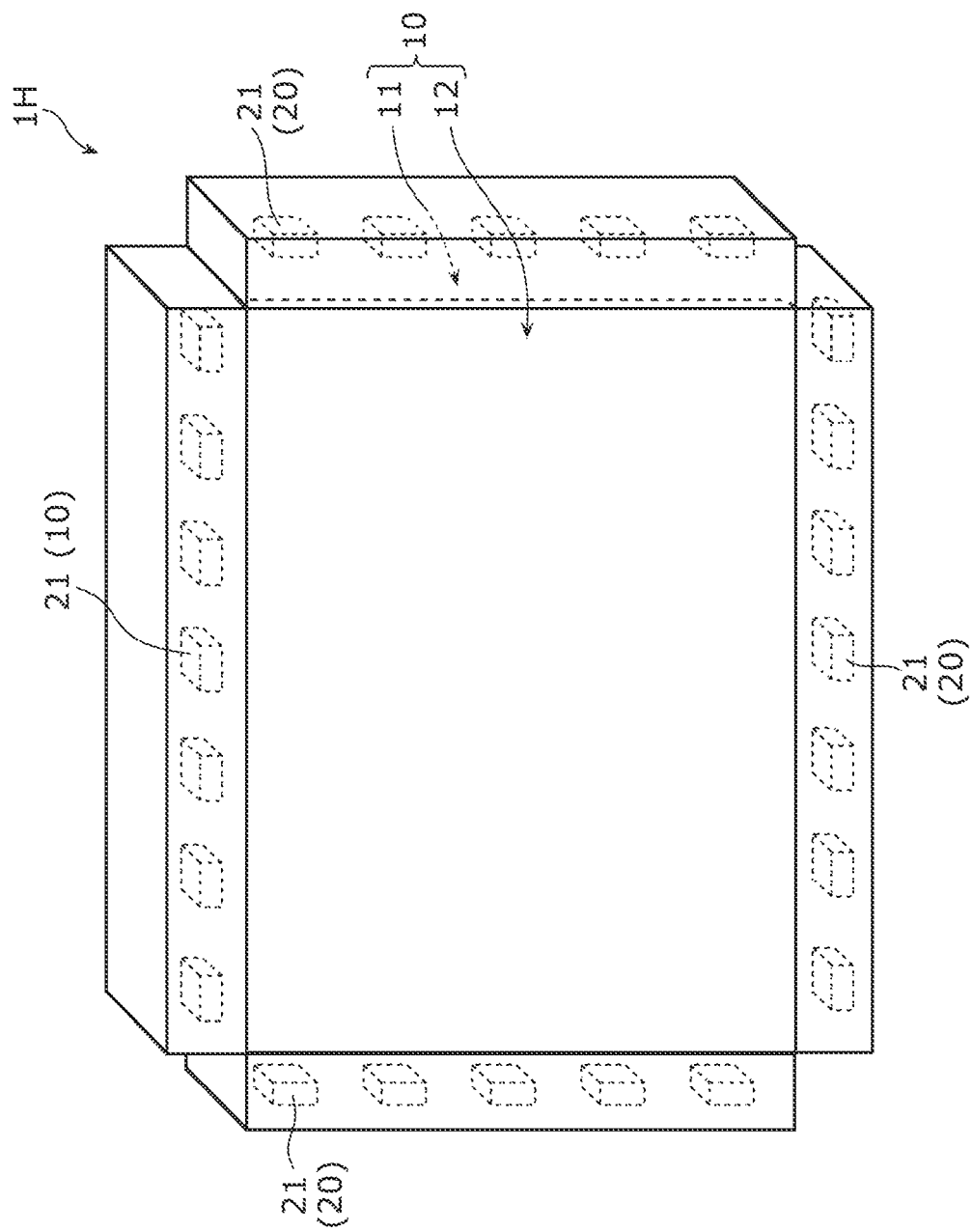
FIG. 25 is a perspective view of a light-emitting device according to Variation 3.

Alternatively, as illustrated in FIG. 25, light-emitting device 1H may include four light sources 20 that are disposed to surround four end surfaces of light-transmissive member 11. To be more specific, light sources 20 may be disposed to surround first end surface 11a that is a left end surface, second end surface 11d that is a right end surface, a third end surface that is an upper end surface, and a fourth end surface that is a lower end surface. This allows light to enter light-transmissive member 11 from the right, left, upper, and lower end surfaces of light-transmissive member 11. As a result, a vertically and horizontally symmetrical change can be achieved in the chromaticity of the light extracted from light guide 10.

Figure 26:
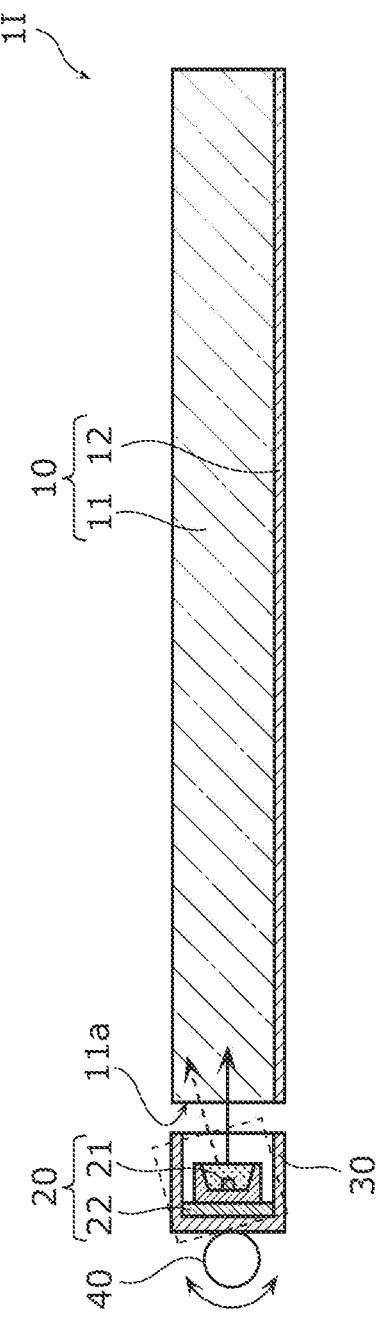
FIG. 26 is a cross-sectional view of a light-emitting device according to Variation 4.

In Embodiments 1 and 2 described above, the optical axis of light source 20 is parallel to first main surface 11b of light-transmissive member 11 and fixed not to change. However, this is not intended to be limiting. For example, as illustrated in FIG. 26, light-emitting device 1I may include optical axis adjustment mechanism 40 that adjusts the optical axis of light source 20. For example, optical axis adjustment mechanism 40 includes an actuator and is a drive system capable of rotating enclosure 30 that accommodates light source 20. Optical axis adjustment mechanism 40 rotates enclosure 30 to adjust an axial direction of the optical axis of light source 20. As a result, a direction of the light to be incident from light source 20 upon first end surface 11a of light-transmissive member can be adjusted. In this way, change in the optical axis direction of light source 20 allows a color of light extracted from light guide 10 to be changed. Thus, the change in the optical axis direction of light source 20 allows the color of the light emitted from light guide 10 to be changed without changing an angle from which light guide 10 is viewed. More specifically, even if light-emitting device 1I according to the present variation is viewed from the same viewpoint, an emission color appears to change. In other words, light with a different specific wavelength can be extracted without changing the angle of view. Moreover, change in the optical axis direction of light source 20 enables extraction of light that is totally reflected and thus cannot be ordinarily extracted. This thereby can further enhance the light extraction efficiency. Here, although not illustrated, a variable light distribution mechanism may be used to change distribution of light emitted from light source 20 instead of changing the optical axis direction of light source 20. In this case, a color of light emitted from light guide 10 can also be changed without changing an angle from which light guide 10 is viewed. Thus, change in a light distribution angle of light emitted from light source 20 without changing the optical axis direction of light source 20 enables extraction of light with a specific wavelength different depending on an angle of view.

Figure 27:
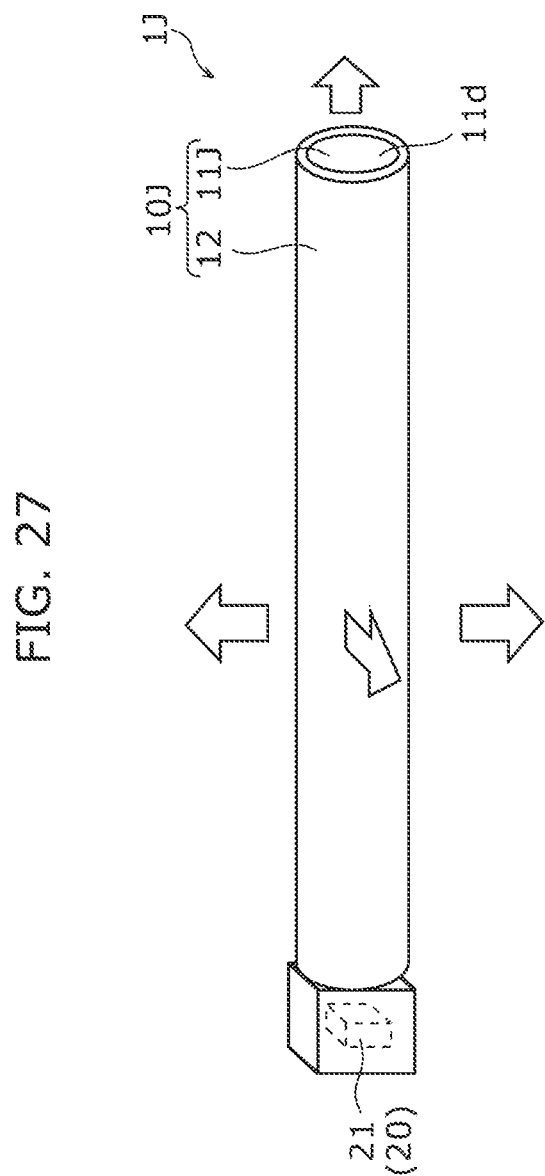
FIG. 27 is a perspective view of a light-emitting device according to Variation 5.

In Embodiments 1 and 2 described above, the plate substrate is used as light-transmissive member 11. However, this is not intended to be limiting. For example, as illustrated in FIG. 27, light-emitting device 1J may include a light guide rod as light guide 10J that includes light-transmissive member 11J in the shape of a rod. In this case, light control layer 12 may be cylindrical to be disposed all over a cylindrical surface of light-transmissive member 11J in the shape of a rod. Alternatively, light control layer 12 may be disposed on a part of the cylindrical surface of light-transmissive member 11J. Note that rod-like light-transmissive member 11J is not limited to a long cylinder that is rigid and may be flexible like optical fiber. Light guide 10J in the shape of such a rod is curvilinear and thus achieves light-emitting device 1J with a high design property. Moreover, a colloidal crystal film like colloidal crystal film G used as light control layer 12 allows light with a specific wavelength out of the light entering light-transmissive member 11J to be emitted from light control layer 12. In addition, such film also selectively allows light with a different specific wavelength to be confined and guided in light-transmissive member 11J and then emitted from second end surface 11d of light-transmissive member 11J. This achieves light-emitting device 1J that functions as both a lighting device that emits illumination light with a specific wavelength and an optical transmission device that transmits light with a different specific wavelength. In this case, light-transmissive member 11J of light guide 10J is an optical waveguide (an optical transmission line).

Figure 28:
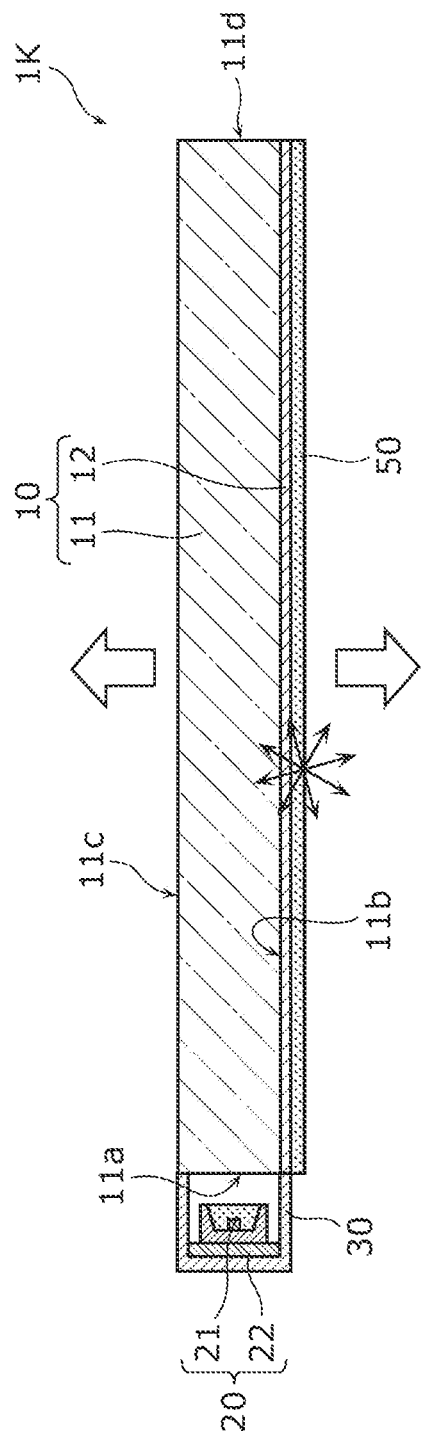
FIG. 28 is a cross-sectional view of a light-emitting device according to Variation 6.

In Embodiments 1 and 2 described above, light control layer 12 is the outermost layer, and the external surface (a light extraction surface) of light control layer 12 is exposed as the interface surface with the air layer. However, this is not intended to be limiting. For example, as illustrated in FIG. 28, light-emitting device 1K may include diffusion layer 50 disposed on the external surface (the light extraction surface) of light control layer 12. For example, diffusion layer 50 is a milky-white diffusion film in which fine particles are dispersed to scatter and reflect incident light. The light diffracted by light control layer 12 is diffused by diffusion layer 50 disposed on the external surface of light control layer 12, and is then extracted to the outside. This achieves more gradual color gradations according to the angles.

Figure 29:
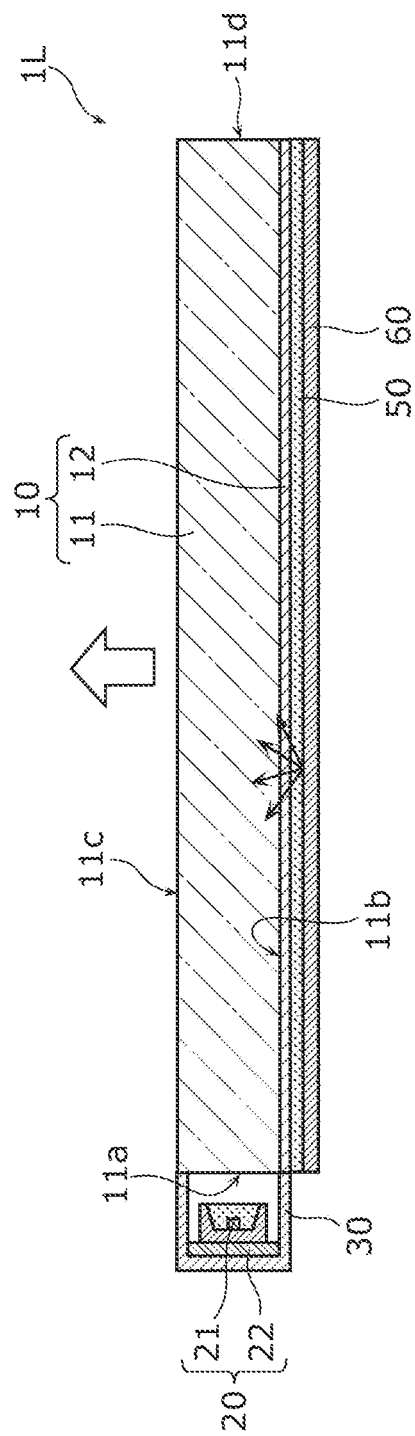
FIG. 29 is a cross-sectional view of a light-emitting device according to Variation 7.

In this case, as illustrated in FIG. 29, light-emitting device 1L may further include reflective sheet 60 affixed to an external surface of diffusion layer 50. The light diffracted by light control layer 12 and diffused by diffusion layer 50 is reflected off reflective sheet 60. As a result, the light is extracted from second main surface 11c of light-transmissive member 11 instead of from diffusion layer 50 of light-transmissive member 11.

Figure 30:
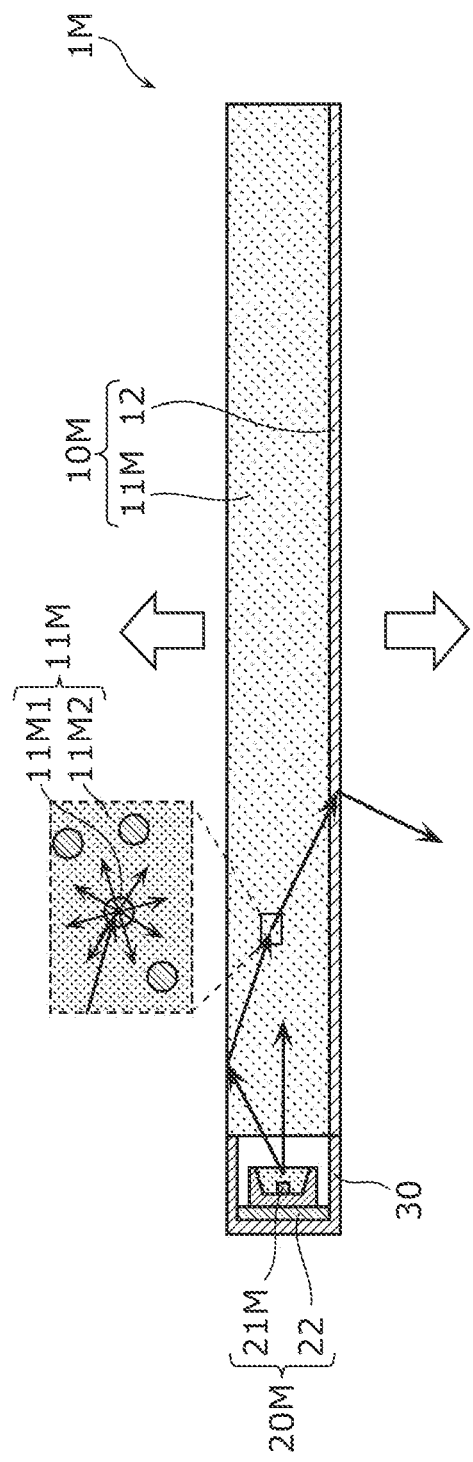
FIG. 30 is a cross-sectional view of a light-emitting device according to Variation 8.

In Embodiments 1 and 2 described above, white light emitted from light source 20 enters light-transmissive member 11 that is transparent, and thereby this white light enters light control layer 12. However, this is not intended to be limiting. For example, as described in FIG. 30, light source 20M of light-emitting device 1M may include light-emitting element 21M that is a blue light-emitting element that emits blue light. In addition, light guide 10M of light-emitting device 1M may include light-transmissive member 11M that is a fluorescent plate made of phosphor-containing resin 11M2 containing yellow phosphor 11M1. In this case, blue light emitted from light source 20M and entering light-transmissive member 11M excites yellow phosphor 11M1 of light-transmissive member 11M to emit yellow light. Then, the blue light of light source 20M and the yellow light of yellow phosphor 11M1 are mixed to generate white light in light-transmissive member 11M. The white light generated in light-transmissive member 11M enters light control layer 12, which diffracts this light. Then, light with a specific wavelength different depending on an angle of view is extracted from light guide 10M. Here, white light to be generated is not limited to the white light generated by the blue light-emitting element and the yellow phosphor. White light may be generated by a combination of the blue light-emitting element, a red phosphor, and a green phosphor. Alternatively, white light may be generated by a combination of a UV light-emitting element that emits ultraviolet light and a plurality of kinds of phosphors. Note that the phosphor may be a fluorescent pigment or a fluorescent dye.

Figure 31:
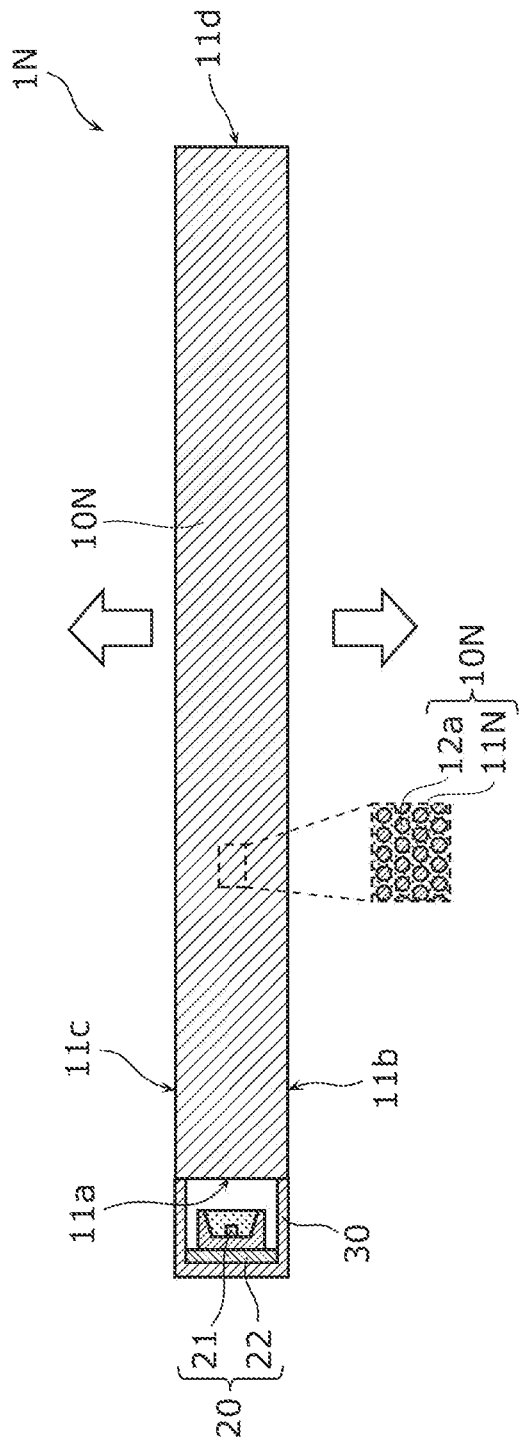
FIG. 31 is a cross-sectional view of a light-emitting device according to Variation 9.

In Embodiments 1 and 2 described above, light guide 10 includes light-transmissive member 11 and light control layer 12 that is disposed on the surface of light-transmissive member 11. However, this is not intended to be limiting. For example, as illustrated in FIG. 31, light guide 10N of light-emitting device 1N may include light-transmissive member 11N and a plurality of nanoparticles 12a included in light-transmissive member 11N. To be more specific, light guide 10N is a bulk body including the plurality of nanoparticles 12a as a colloidal crystal. Here, light-transmissive member 11N is made of a light-transmissive resin material, for example.

Figure 32:
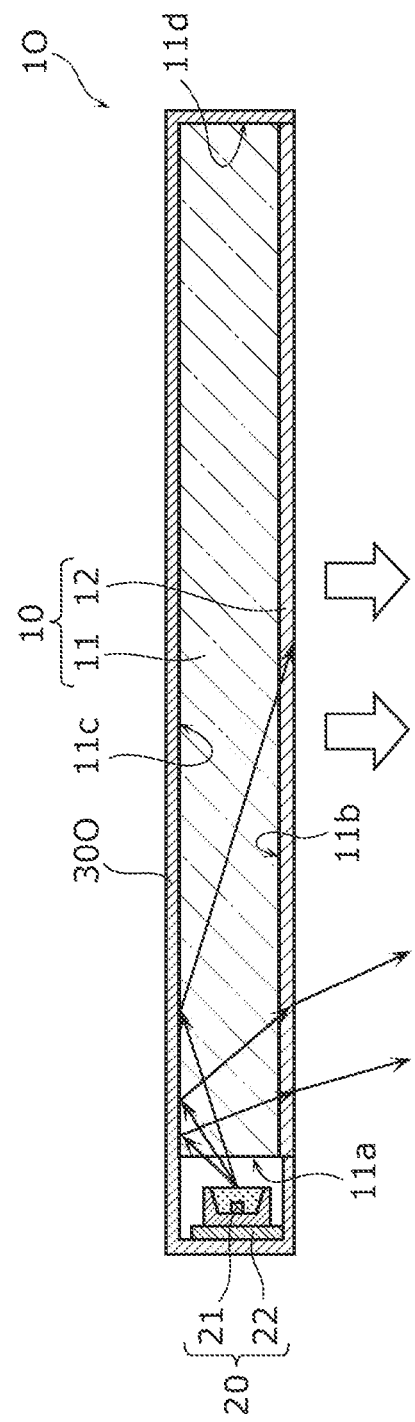
FIG. 32 is a cross-sectional view of a light-emitting device according to Variation 10.

In Embodiments 1 and 2 described above, second main surface 11c of light-transmissive member 11 is exposed to the outside. However, this is not intended to be limiting. For example, as illustrated in FIG. 32, second main surface 11c of light-transmissive member 11 included in light-emitting device 1O may be covered by a part of enclosure 30O. In this case, the part of enclosure 30O that covers second main surface 11C of light-transmissive member 11 may have light reflectivity. This allows the part of enclosure 30O that covers second main surface 11C of light-transmissive member 11 to function as a reflector that reflects the light guided in light-transmissive member 11 toward first main surface 11b. Thus, more light is allowed to enter light control layer 12 from light-transmissive member 11 and thereby more light is allowed to be extracted to the outside of light guide 10 from light control layer 12, as in Embodiment 2 described above.

Figure 33:
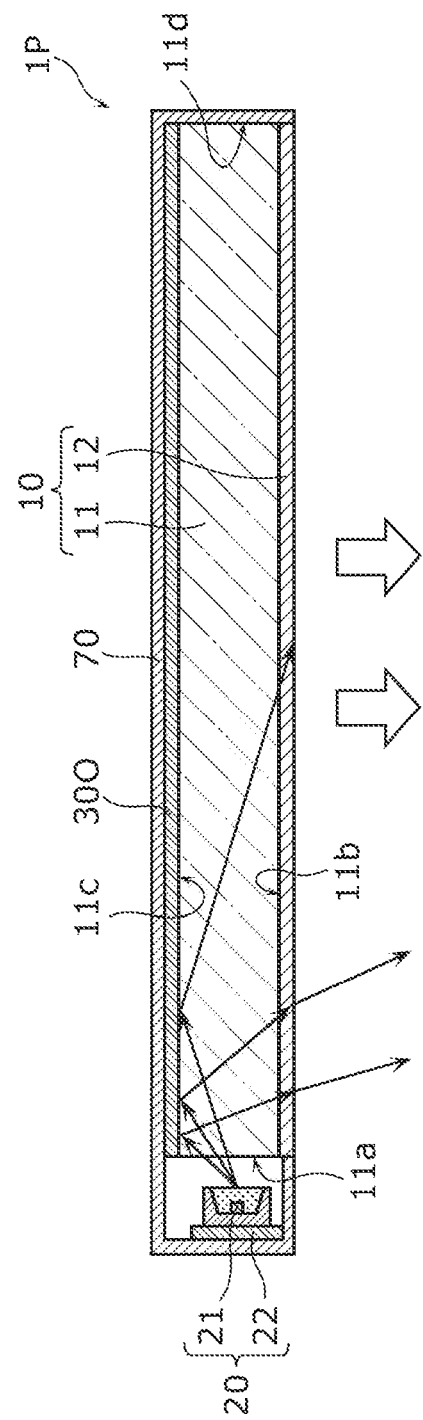
FIG. 33 is a cross-sectional view of a light-emitting device according to Variation 11.

As illustrated in FIG. 33, instead of reflecting the light guided in light-transmissive member 11 using the part of enclosure 30, light-emitting device 1P may additionally include reflective sheet 70 between light-transmissive member 11 and the part of enclosure 30O that covers second main surface 11c of light-transmissive member 11. More specifically, reflective sheet 70 may be disposed in contact with second main surface 11c of light-transmissive member 11, as a reflector that reflects the light guided in light-transmissive member 11 toward first main surface 11b. This case also allows more light to be extracted to the outside of light guide 10 from light control layer 12. Here, reflective sheet 70 may be made of a white resin. Alternatively, reflective sheet 70 may be a sheet on which a metal film is formed, or may be a metal sheet itself. Moreover, reflective sheet 70 may be a prism sheet on which a reflective prism is formed.

Figure 34:
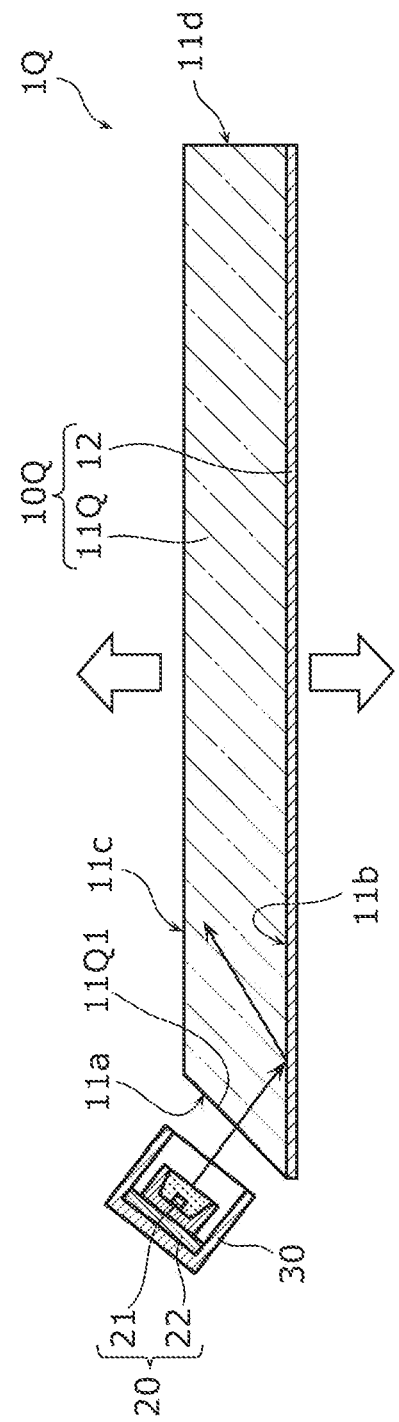
FIG. 34 is a cross-sectional view of a light-emitting device according to Variation 12.

In Embodiments 1 and 2 described above, first end surface 11a of light-transmissive member 11 is perpendicular to first main surface 11b. However, this is not intended to be limiting. For example, as illustrated in FIG. 34, light guide 10Q of light-emitting device 1Q may include light-transmissive member 11Q having an end part cut away. More specifically, an end part of light-transmissive member 11Q has slope 11Q1, and thus first end surface 11a slopes to first main surface 11b. In this case, light source 20 may be positioned so that the optical axis of light source 20 is perpendicular to first end surface 11a that is sloped.

In Embodiments 1 and 2 described above, first end surface 11a of light-transmissive member 11 is flat. However, this is not intended to be limiting. For example, as illustrated in FIG. 35, first end surface 11a of light-transmissive member 11R of light guide 10R in light-emitting device 1R may include recess 11R1 that recesses toward the inside of light-transmissive member 11R and has a tapered surface. This prevents the light of light source 20 from reflecting off first end surface 11a and thereby allows more light to enter light-transmissive member 11R from light source 20. More specifically, incidence efficiency of the light from light source 20 to light-transmissive member 11R can be enhanced. Thus, more light is allowed to be extracted from light guide 10R to the outside, which thereby enhances the light extraction efficiency of light-emitting device 1R.

In Embodiments 1 and 2 described above, light control layer 12, which has the three-dimensional periodic structure, is the colloidal crystal film including the colloidal crystal. However, this is not intended to be limiting. For example, light control layer 12 may have a three-dimensional periodic structure like a diffraction grating that generates diffracted light changing in color depending on an angle of view. Here, a diffracting grating that generates the diffracted light as described in Embodiment 1 may be costly because of its precise microfabrication. In contrast, a colloidal crystal film is made simply by coating. Even a colloidal crystal film having a large area can be manufactured at low cost. For this reason, a colloidal crystal film including a colloidal crystal may be used as light control layer 12.

In Embodiments 1 and 2 described above, the light emitted from a single light source 20 enters light-transmissive member 11 from first end surface 11a of light-transmissive member 11. However, this is not intended to be limiting. For example, light emitted from a single light source 20 may enter light-transmissive member 11 from second end surface 11d of light-transmissive member 11, or may enter light-transmissive member 11 from first main surface 11b or second main surface 11c of light-transmissive member 11. In this case, light source 20 may be disposed opposite to second end surface 11d, first main surface 11b, or second main surface 11c of light-transmissive member 11, instead of opposite to first end surface 11a of light-transmissive member 11.

In Embodiments 1 and 2 described above, light source 20 is the white light source that emits light of high intensity continuous in a broadband wavelength range. However, this is not intended to be limiting. For example, light source 20 may emit light with a single wavelength, that is, with a single specific peak wavelength. Alternatively, light source 20 may emit light with a plurality of wavelengths, that is, with a plurality of specific peak wavelengths. For example, light source 20 may emit red light with a single wavelength, or white light including three peak wavelengths of red, green, and blue. Here, light source 20 that emits white light enables the extracted light (the diffracted light) to change in color according to an angle of view. In other words, color gradations of light are visible according to an angle of observation. On the other hand, light source 20 that emits light with a single wavelength does not cause color change visible to the user and thus light is extracted only from an angle corresponding to the single wavelength. This achieves the light-emitting device that illuminates only from the angle corresponding to the single wavelength.

In Embodiments 1 and 2 described above, light source 20 includes the blue LED chip and the yellow phosphor to emit white light. However, this is not intended to be limiting. For example, white light may be emitted using a combination of a blue LED chip and a phosphor-containing resin that contains a red phosphor and a green phosphor instead of a yellow phosphor.

In Embodiments 1 and 2 described above, light-emitting element 21 of light source 20 includes the blue LED chip that emits blue light. However, this is not intended to be limiting. For example, light-emitting element 21 may include an LED chip that emits light of a color other than blue. For example, light-emitting element 21 may include an LED chip that emits ultraviolet light. In this case, phosphors emitting three primary colors (red, green, and blue) may be combined and used as phosphor particles. The phosphor is used as a wavelength converter. However, the wavelength converter may not be a phosphor. For example, the wavelength converter may be made using a material including a substance that absorbs light of a given wavelength and emits light of a wavelength different from the given wavelength. Examples of such material include a semiconductor, a metal complex, an organic dye, and a pigment.

In Embodiments 1 and 2 described above, light source 20 is the LED module including the LED. However, this is not intended to be limiting. For example, light source 20 may be a solid-state light-emitting element, other than an LED, that includes a semiconductor laser or an organic electro luminescence (EL) for instance. Alternatively, light source 20 may be a fluorescent lamp, such as a cold cathode fluorescent lamp (CCFL). Light source 20 may be any element that emits light into light-transmissive member 11.

The light-emitting device according to each of Embodiments 1 and 2 and each of the variations may be used as a lighting device, for example. In this case, the light-emitting device used as the lighting device enables a lighting system including at least one lighting device. With this, space production can be made using illumination light that changes in color depending on an angle from which the lighting device is viewed.

Alternatively, the light-emitting device used as an optical transmission device enables a light communication system including at least one optical transmission device. In this way, the light extracted from light-emitting device 1 can be used in various applications other than being used as illumination light.

In each of Embodiments 1 and 2 and each of the variations described above, the light-emitting device includes the light guide that becomes transparent when no light is emitted from light source 20 (when the light source is turned off). More specifically, the opposite side of the light guide can be seen through the light guide (a transparent state). This is because the light control layer formed of the colloidal crystal film does not reflect (that is, becomes transparent to) light with a wavelength other than a specific wavelength. In contrast, when light source 20 emits light (when the light source is turned on), the light guide of the light-emitting device according to each of Embodiments 1 and 2 and each of the variations described above emits light, which is to be extracted. This light emission of the light guide causes the other side of the light guide not to be seen through the light guide (a shading state). This is because the light control layer formed of the colloidal crystal film allows the color of light with the specific wavelength to be seen as described above. In this way, the light-emitting device according to each of Embodiments 1 and 2 and each of the variations described above can easily switch between ON and OFF of visual information, that is, between the transparent state and the shading state, using an electrical signal. This enables the light-emitting device according to each of Embodiments 1 and 2 and each of the variations described above to be used as a partition, for example, that visually separates a space. Extraction of light with a specific wavelength according to an angle, in particular, enables this light-emitting device to be used as a partition that has an excellent design property.

In addition, the present disclosure may include embodiments obtained by making various modifications on the above embodiments which those skilled in the art will arrive at, or embodiments obtained by selectively combining the elements and functions disclosed in the above embodiments, without materially departing from the scope of the present disclosure.

REFERENCE SIGNS LIST 1, 1A, 1B, 1C, 1D, 1E, 1F, 1G, 1H, 1I, 1J, 1K, 1L, 1M, 1N, 1O, 1P, 1Q, 1R light-emitting device
10, 10A, 10B, 10C, 10D, 10E, 10F, 10J, 10M, 10N, 10Q, 10R light guide
11, 11E, 11J, 11M, 11N, 11Q, 11R light-transmissive member
11a first end surface
11b first main surface
11c second main surface
11c1 recess (reflector)
12, 12A, 12B, 12C, 12D light control layer
20, 20M light source
40 optical axis adjustment mechanism
70 reflective sheet (reflector)

The invention claimed is:

1. A light-emitting device comprising:
a light guide that includes (i) a light-transmissive member that is light-transmissive at least in a visible light region and (ii) a light control layer that is disposed on at least a part of a surface of the light-transmissive member; and
a light source that emits light toward at least one end surface of the light-transmissive member,
wherein the light control layer has reflected-wavelength selectivity that makes a wavelength of reflected light dependent on an incident angle of incident light, and
wherein the light control layer has a colloidal crystal including a plurality of nanoparticles periodically arranged in each of three axial directions, the three axial directions including one axial direction along a thickness of the light-transmissive member and two axial directions parallel to the surface of the light-transmissive member.

2. The light-emitting device according to claim 1,
wherein the light-transmissive member is a substrate that has a first main surface and a second main surface that is opposed to the first main surface, and
the light control layer is disposed on the first main surface.

3. The light-emitting device according to claim 2,
wherein the second main surface of the substrate is provided with a reflector that reflects light guided in the substrate toward the first main surface.

4. The light-emitting device according to claim 3,
wherein the reflector is a plurality of recesses formed in the second main surface of the substrate.

5. The light-emitting device according to claim 3,
wherein the reflector is a reflective sheet that is in contact with the second main surface of substrate.

6. The light-emitting device according to claim 1,
wherein the light-transmissive member is a substrate that has a first main surface and a second main surface that is opposed to the first main surface, and
the light control layer is disposed on each of the first main surface and the second main surface.

7. The light-emitting device according to claim 1,
wherein the light control layer is a multi-layer film including a plurality of light control films stacked, the plurality of light control films each having the reflected-wavelength selectivity.

8. The light-emitting device according to claim 1,
wherein the light control layer has a thickness between 5 µm and 100 µm inclusive.

9. The light-emitting device according to claim 1, wherein the light source includes a light-emitting diode.

10. The light-emitting device according to claim 1, the light-emitting device further comprising
an optical axis adjustment mechanism that adjusts an optical axis of the light source.

11. The light-emitting device according to claim 1, the light-emitting device further comprising
a variable light distribution mechanism that changes distribution of light emitted from the light source.

12. A lighting system comprising the light-emitting device according to claim 1 as a lighting device.

13. An optical communication system comprising the light-emitting device according to claim 1 as an optical transmission device.

14. The light-emitting device according to claim 1, wherein the light control layer has a three-dimensional periodic structure.

* * * * *